United States Patent
Krishnaswamy et al.

(10) Patent No.: US 10,747,752 B2
(45) Date of Patent: *Aug. 18, 2020

(54) SPACE MANAGEMENT FOR TRANSACTIONAL CONSISTENCY OF IN-MEMORY OBJECTS ON A STANDBY DATABASE

(71) Applicant: Oracle International Corporation, Redwood Shores, CA (US)

(72) Inventors: Vasudha Krishnaswamy, Fremont, CA (US); Kartik Kulkarni, Milpitas, CA (US); Sukhada Pendse, Foster City, CA (US); Akshay Kulkarni, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/892,677

(22) Filed: Feb. 9, 2018

(65) Prior Publication Data

US 2018/0165324 A1 Jun. 14, 2018

Related U.S. Application Data

(63) Continuation-in-part of application No. 15/253,780, filed on Aug. 31, 2016.
(Continued)

(51) Int. Cl.
*G06F 16/22* (2019.01)
*G06F 16/23* (2019.01)
(Continued)

(52) U.S. Cl.
CPC ......... *G06F 16/2365* (2019.01); *G06F 3/065* (2013.01); *G06F 3/067* (2013.01);
(Continued)

(58) Field of Classification Search
CPC ............ G06F 16/2379; G06F 16/2365; G06F 16/275; G06F 16/221; G06F 16/2455; G06F 16/27; G06F 16/2255
See application file for complete search history.

(56) References Cited

U.S. PATENT DOCUMENTS

| | | | |
|---|---|---|---|
| 4,507,751 A | 3/1985 | Gawlick et al. | |
| 4,710,926 A | 12/1987 | Brown et al. | |

(Continued)

FOREIGN PATENT DOCUMENTS

| | | |
|---|---|---|
| EP | 0 503 417 A2 | 9/1992 |
| EP | 050180 A | 9/1992 |

(Continued)

OTHER PUBLICATIONS

Yang, U.S. Appl. No. 15/266,375, filed Sep. 15, 2016, Interview Summary, dated Feb. 14, 2019.

(Continued)

*Primary Examiner* — David T. Brooks
*Assistant Examiner* — Berhanu Mitiku
(74) *Attorney, Agent, or Firm* — Hickman Palermo Becker Bingham LLP

(57) ABSTRACT

Embodiments store transaction metadata in dedicated pools of allocated memory chunks. Portions of the pools of allocated memory chunks are dedicated to the respective apply slave processes that mine and process change records. Also, the pools of allocated memory chunks are anchored within the structure of a transaction log such that buffering and application of metadata for one transaction does not block required buffering and application of metadata for other transactions. The standby database system pre-processes transaction metadata in preparation for application of the metadata to invalidate appropriate portions of MF data. Further, embodiments divide the work of pre-processing (Continued)

invalidation records among the many apply slave processes that record the invalidation records. A garbage collection selects memory chunks for garbage collection in reverse order of how the chunks were allocated. Also, a deduplication algorithm ensures that typically only a single invalidation message per block is applied to invalidate MF data.

22 Claims, 10 Drawing Sheets

Related U.S. Application Data

(60) Provisional application No. 62/245,443, filed on Oct. 23, 2015.

(51) Int. Cl.
| | | |
|---|---|---|
| *G06F 16/27* | (2019.01) | |
| *G06F 3/06* | (2006.01) | |
| *G06F 16/25* | (2019.01) | |
| *G06F 11/00* | (2006.01) | |
| *G06F 11/20* | (2006.01) | |
| *G06F 11/14* | (2006.01) | |
| *G06F 11/16* | (2006.01) | |

(52) U.S. Cl.
CPC .......... *G06F 3/0611* (2013.01); *G06F 3/0619* (2013.01); *G06F 3/0631* (2013.01); *G06F 3/0644* (2013.01); *G06F 3/0659* (2013.01); *G06F 3/0679* (2013.01); *G06F 11/00* (2013.01); *G06F 11/1471* (2013.01); *G06F 11/2094* (2013.01); *G06F 11/2097* (2013.01); *G06F 16/2255* (2019.01); *G06F 16/2379* (2019.01); *G06F 16/258* (2019.01); *G06F 16/27* (2019.01); *G06F 11/1474* (2013.01); *G06F 11/1658* (2013.01); *G06F 2201/80* (2013.01); *G06F 2201/835* (2013.01)

(56) References Cited

U.S. PATENT DOCUMENTS

| | | |
|---|---|---|
| 4,782,325 A | 11/1988 | Jeppsson et al. |
| 4,945,474 A | 7/1990 | Elliott et al. |
| 5,095,421 A | 3/1992 | Freund |
| 5,146,571 A | 9/1992 | Logan |
| 5,182,752 A | 1/1993 | DeRoo et al. |
| 5,233,618 A | 8/1993 | Gilder et al. |
| 5,241,675 A | 8/1993 | Sheth et al. |
| 5,263,156 A | 11/1993 | Bowen et al. |
| 5,287,496 A | 2/1994 | Chen et al. |
| 5,327,556 A | 7/1994 | Mohan |
| 5,329,628 A | 7/1994 | Yomamoto et al. |
| 5,333,265 A | 7/1994 | Orimo et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,423,037 A | 6/1995 | Hvasshovd |
| 5,454,102 A | 9/1995 | Tang et al. |
| 5,487,164 A | 1/1996 | Kirchhofer et al. |
| 5,553,279 A | 9/1996 | Goldring |
| 5,555,404 A | 9/1996 | Torbjørnsen et al. |
| 5,559,991 A | 9/1996 | Kanfi |
| 5,574,906 A | 11/1996 | Morris |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,806,076 A | 9/1998 | Ngai et al. |
| 5,870,758 A | 2/1999 | Bamford et al. |
| 5,870,759 A | 2/1999 | Bauer et al. |
| 5,870,763 A | 2/1999 | Lomet |
| 5,893,930 A | 4/1999 | Song |
| 5,924,096 A | 7/1999 | Draper et al. |
| 5,956,731 A | 9/1999 | Bamford et al. |
| 5,960,436 A | 9/1999 | Chang et al. |
| 5,974,427 A | 10/1999 | Reiter |
| 5,983,277 A | 11/1999 | Heile et al. |
| 5,991,771 A | 11/1999 | Falls et al. |
| 6,009,432 A | 12/1999 | Tarin |
| 6,009,542 A | 12/1999 | Koller et al. |
| 6,014,669 A | 1/2000 | Slaughter et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1 | 2/2003 | Sunkara |
| 6,535,869 B1 | 3/2003 | Housel, III |
| 6,560,743 B2 | 5/2003 | Plants |
| 6,574,717 B1 | 6/2003 | Ngai et al. |
| 6,691,139 B2 | 2/2004 | Ganesh et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,003,694 B1 | 2/2006 | Anderson, Jr. |
| 7,024,656 B1 | 4/2006 | Ahad |
| 7,076,508 B2 | 7/2006 | Bourbonnais et al. |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,155,463 B1 | 12/2006 | Wang et al. |
| 7,222,136 B1 | 5/2007 | Brown et al. |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,287,034 B2 | 10/2007 | Wong et al. |
| 7,290,017 B1 | 10/2007 | Wang et al. |
| 7,370,068 B1 | 5/2008 | Pham et al. |
| 7,464,113 B1 | 12/2008 | Gikar |
| 7,599,967 B2 | 10/2009 | Girkar et al. |
| 7,600,063 B2 | 10/2009 | Loaiza |
| 7,627,612 B2 | 12/2009 | Ahal et al. |
| 7,627,614 B2 | 12/2009 | Hu et al. |
| 7,636,538 B2 | 12/2009 | Okamoto et al. |
| 7,644,084 B2 | 1/2010 | Rapp |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2 | 9/2011 | Seddukhin |
| 8,286,182 B2 | 10/2012 | Chan |
| 8,364,648 B1 | 1/2013 | Sim-Tang |

(56) References Cited

U.S. PATENT DOCUMENTS

| | | |
|---|---|---|
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2 | 4/2014 | Krishnan et al. |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1 | 7/2015 | Chu |
| 9,146,934 B2 | 9/2015 | Hu et al. |
| 9,244,996 B2 | 1/2016 | Bourbonnais |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |
| 2003/0126114 A1 | 7/2003 | Tedesco |
| 2003/0140050 A1 | 7/2003 | Li |
| 2003/0140288 A1 | 7/2003 | Loaiza et al. |
| 2003/0212660 A1 | 11/2003 | Kerwin |
| 2003/0217064 A1 | 11/2003 | Walters |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0267809 A1 | 12/2004 | East et al. |
| 2005/0005083 A1* | 1/2005 | Ozdemir ............... G06F 12/023 |
| | | 711/170 |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1 | 1/2006 | Pommerenk |
| 2006/0047713 A1 | 3/2006 | Gornshtein |
| 2006/0064405 A1 | 3/2006 | Jiang et al. |
| 2006/0080646 A1 | 4/2006 | Aman |
| 2006/0129559 A1 | 6/2006 | Sankaran |
| 2006/0168585 A1 | 7/2006 | Grcevski |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1 | 9/2006 | Loaiza et al. |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | MacHardy et al. |
| 2007/0174292 A1 | 7/2007 | Li et al. |
| 2007/0226277 A1 | 9/2007 | Holenstein et al. |
| 2007/0239680 A1 | 10/2007 | Oztekin et al. |
| 2007/0244918 A1 | 10/2007 | Lee et al. |
| 2008/0005112 A1 | 1/2008 | Shavit |
| 2008/0016074 A1 | 1/2008 | Ben-Dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0162587 A1 | 7/2008 | Auer |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |
| 2008/0281865 A1 | 11/2008 | Price et al. |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0182746 A1 | 7/2009 | Mittal et al. |
| 2009/0248756 A1 | 10/2009 | Akidau |
| 2009/0268903 A1 | 10/2009 | Bojinov et al. |
| 2009/0307290 A1 | 12/2009 | Barsness et al. |
| 2010/0036843 A1 | 2/2010 | MacNaughton et al. |
| 2010/0082646 A1 | 4/2010 | Meek et al. |
| 2010/0082648 A1 | 4/2010 | Potapov |
| 2010/0122026 A1 | 5/2010 | Umaamageswaran et al. |
| 2010/0145909 A1 | 6/2010 | Ngo |
| 2010/0211577 A1 | 8/2010 | Shimuzu et al. |
| 2010/0235335 A1 | 9/2010 | Heman et al. |
| 2010/0250549 A1 | 9/2010 | Muller et al. |
| 2010/0318495 A1 | 12/2010 | Yan et al. |
| 2010/0318570 A1 | 12/2010 | Narasinghanallur et al. |
| 2011/0004586 A1 | 1/2011 | Cherryholmes et al. |
| 2011/0029569 A1 | 2/2011 | Ganesh et al. |
| 2011/0060724 A1 | 3/2011 | Chan |
| 2011/0066791 A1 | 3/2011 | Goyal et al. |
| 2011/0087633 A1 | 4/2011 | Kreuder et al. |
| 2011/0087637 A1 | 4/2011 | Sundaram et al. |
| 2011/0099179 A1 | 4/2011 | Balebail |
| 2011/0138123 A1 | 6/2011 | Aditya et al. |
| 2011/0145207 A1 | 6/2011 | Agrawal et al. |
| 2011/0231362 A1 | 9/2011 | Attarde et al. |
| 2011/0238655 A1 | 9/2011 | Clorain et al. |
| 2011/0307450 A1 | 12/2011 | Hahn et al. |
| 2012/0054158 A1 | 3/2012 | Hu et al. |
| 2012/0054533 A1 | 3/2012 | Shi et al. |
| 2012/0054546 A1 | 3/2012 | Kampouris |
| 2012/0109926 A1 | 5/2012 | Novik et al. |
| 2012/0173515 A1 | 7/2012 | Jeong et al. |
| 2012/0259809 A1 | 10/2012 | Hermann |
| 2012/0278282 A1 | 11/2012 | Lu |
| 2012/0284228 A1 | 11/2012 | Ghosh |
| 2012/0323849 A1 | 12/2012 | Garin et al. |
| 2012/0323971 A1 | 12/2012 | Pasupuleti |
| 2013/0085742 A1 | 4/2013 | Baker et al. |
| 2013/0117237 A1 | 5/2013 | Thomsen et al. |
| 2013/0132674 A1 | 5/2013 | Sundrani |
| 2013/0198133 A1 | 8/2013 | Lee |
| 2013/0212068 A1 | 8/2013 | Talius et al. |
| 2014/0040218 A1 | 2/2014 | Kimura et al. |
| 2014/0059020 A1 | 2/2014 | Hu et al. |
| 2014/0075493 A1 | 3/2014 | Krishnan et al. |
| 2014/0095452 A1 | 4/2014 | Lee |
| 2014/0095530 A1 | 4/2014 | Lee et al. |
| 2014/0095546 A1 | 4/2014 | Kruglikov et al. |
| 2014/0164331 A1 | 6/2014 | Li |
| 2014/0258241 A1 | 9/2014 | Chen |
| 2014/0279840 A1 | 9/2014 | Chan et al. |
| 2015/0032694 A1 | 1/2015 | Rajamani et al. |
| 2015/0088811 A1 | 3/2015 | Hase et al. |
| 2015/0088822 A1 | 3/2015 | Raja |
| 2015/0088824 A1 | 3/2015 | Kamp et al. |
| 2015/0088830 A1* | 3/2015 | Kamp ............... G06F 11/2058 |
| | | 707/648 |
| 2015/0088926 A1 | 3/2015 | Chavan et al. |
| 2015/0089125 A1 | 3/2015 | Mukherjee et al. |
| 2015/0089134 A1 | 3/2015 | Mukherjee et al. |
| 2015/0120659 A1 | 4/2015 | Srivastava et al. |
| 2015/0120780 A1 | 4/2015 | Jain |
| 2015/0254240 A1 | 9/2015 | Li |
| 2015/0317183 A1* | 11/2015 | Little ............... G06F 9/467 |
| | | 707/703 |
| 2016/0179867 A1 | 6/2016 | Li et al. |
| 2016/0292167 A1 | 10/2016 | Tran et al. |
| 2017/0116252 A1 | 4/2017 | Krishnaswamy |
| 2017/0116298 A1 | 4/2017 | Ravipati |
| 2018/0074915 A1 | 3/2018 | Yang |

(56) References Cited

U.S. PATENT DOCUMENTS

| | | | |
|---|---|---|---|
| 2018/0121511 | A1 | 5/2018 | Li |
| 2018/0349458 | A1 | 12/2018 | Guirguis |

FOREIGN PATENT DOCUMENTS

| | | | |
|---|---|---|---|
| EP | 2 608 070 A1 | 6/2013 | |
| GB | 1 332 631 A | 10/1973 | |
| GB | 2505 185 A | 2/2014 | |
| JP | 59-081940 | 5/1984 | |
| JP | 02-189663 | 7/1990 | |
| JP | 08-235032 | 9/1996 | |
| JP | 10-040122 | 2/1998 | |
| JP | 10-240575 | 9/1998 | |
| WO | WO 2007/078444 A1 | 7/2007 | |

OTHER PUBLICATIONS

U.S. Appl. No. 13/829,103, filed Mar. 14, 2013, Office Action, dated Oct. 22, 2014.
U.S. Appl. No. 13/829,103, filed Mar. 14, 2013, Office Action, dated Jul. 18, 2016.
U.S. Appl. No. 13/829,103, filed Mar. 14, 2013, Final Office Action, dated Jul. 16, 2015.
Chan, U.S. Appl. No. 13/829,103, filed Mar. 14, 2013, Office Action, dated Jun. 26, 2017.
Chan, U.S. Appl. No. 13/829,103, filed Mar. 14, 2013, Office Action, dated Jan. 31, 2018.
Chan, U.S. Appl. No. 13/829,103, filed Mar. 14, 2013, Interview Summary, dated May 11, 2017.
Chan U.S. Appl. No. 13/829,103, filed Mar. 14, 2013, Office Action, dated Jan. 27, 2017.
Chan, U.S. Appl. No. 13/829,103, filed Mar. 14, 2013, Notice of Allowance, dated Aug. 1, 2018.
Nadimpalli, Rajeev, "How to Run Two or More Databases in Different Time Zones on the Same Machine", dated May 2002, 7 pages.
Yang, U.S. Appl. No. 15/266,375, filed Sep. 15, 2016, Notice of Allowance, dated Apr. 11, 2019.
Li, U.S. Appl. No. 15/399,525, filed Oct. 31, 2016, Office Action, dated May 2, 2019.
Li, U.S. Appl. No. 15/339,525, filed Oct. 31, 2016, Office Action, dated May 2, 2019.
Yang, U.S. Appl. No. 15/266,375, filed Sep. 15, 2016, Office Action, dated Nov. 29, 2018.
Oracle, "Oracle Data Guard", Concepts and Administration 12c Release 1 (12.1), dated Nov. 2015, 50 pages.
Oracle, "Oracle Active Data Guard", Real-Time Protection and Availability, Oracle White Paper, dated Oct. 2015, 22 pages.
Oracle, "Maximum Availability Architecture", Oracle Best Practices for High Availability, dated Sep. 2011, 42 pages.
Teschke, et al., "Concurrent Warehouse Maintenance Without Comprising Session Consistency", 1998, 10 pages.
Vassilakis et al., "Implementation of Transaction and Concurrency Control Support in a Temporal DBMS" Information Systems, vol. 23, No. 5, 1998, 16 pages.
Bober et al., "On Mixing Queries and Transactions Via Multiversion Locking", IEEE, 1992, 11 pages.
Mohan et al., "Efficient and Flexible Methods for Transient Versioning of Records to Avoid Locking by Reading-Only Transactions", XP000393583, IBM Almaden Research Center, Dated Feb. 6, 1992, 11 pages.
Rajeev Kumar et al., Oracle DBA, A Helping Hand, Container Database and Pluggable Database (CDB & PDB), retrieved from the internet on Dec. 4, 2013, 2 pages.
Preimesberger, Chris, "Oracle Profits Up, but Revenues Slip" Oracle, dated Sep. 20, 2012, 2 pages.
Oracle Help Center , "Database 2 Day + Data Replication and Integration Guide", 3 Accessing and Modifying Information in Multiple Databases, dated 2016, 14 pages.

Oracle Base, Multitenant: Create and Configure a Pluggable Database (PDB) in Oracle Database 12c Release 1 (12.1), dated Jan. 8, 2014, 16 pages.
Muhammad Anwar, "How to Install Oracle 12c Multitenant Pluggable Database", Dated Feb. 24, 2012, 27 pages.
Garcia-Molina et al., "Database System Implementation", dated Jan. 1, 2000, 84 pages.
Francisco Munoz et al., "Oracle Database 12c Backup and Recovery Survival Guide", dated Sep. 24, 2013, 8 pages.
Dominic Betts et al., "Developing Multi-Tenant Applications for the Cloud", 3rd Edition, Microsoft, 2012, 246 pages.
Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.
Anonymous: "Oracle-Base—Multitenant: Overview of Container Databases (CDB) and Pluggable Databases (PDB)", dated Mar. 3, 2014, 4 pages.
Anonymous, :An Oracle White Paper Oracle Database Appliance: Migration Strategies, dated Jun. 2012, 14 pages.
Zhe, Li, et al., "PERF join: an alternative to two-way semijoin and Bloomjoin" Proceedings of the 1995 ACM, New York. NY, US., 1995, pp. 187-144.
Shao et al., "Clotho: Decoupling Memory Page Layout from Storage Organization", Proceedings of the 30th VLDB Conference, Toronto, Canada, 2004, 12 pages.
Schaffner et al., "A Hybrid Row-Column OLTP Database Architecture for Operational Reporting", dated Aug. 24, 2008, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Oracle Database Administrator's Guide, 11g Release 2 (11.2), Chapter 26, Feb. 2010, 54 pages. http://download.oracle.com/docs/cd/E11882_01/server.112/e10595.pdf.
Oracle Database Administrator's Guide, 10g Release 2 (10.2), Chapter 24, May 2006, 34 pages. http://download.oracle.com/docs/cd/B19306_01/server.102/b14231.pdf.
O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.
Nirmesh, Malviya, "Recovery Algorithms for In-Memory OLTP Databases", Master of Science Thesis, dated Jul. 1, 2012, 66 pages.
Loizos, M., et al., "Improving distributed join efficiency with extended bloom filter operations", Advanced Networking and Applications, 2007. AINA '07., 21st international Conf. IEEE, May 1, 2007.
Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.
IBM, "A Scheduling Algorithm for Processing Mutually Exclusive Workloads in a Multi-System Configuration", dated Aug. 19, 2002, IEEE, 3 pages.
Zhang Ho et al., "In-Memory Big Data Management and Processing: A Survery", IEEE Transactions on Knowledge and Data Engineering, vol. 27, No. 7, dated Jul. 31, 2015, 30 pages.
Vishal Sikka et al., "Efficient Transaction Processing in SAP Hana Database", Proceedings of the 2012, International Conference on Management of Data, dated Jan. 31, 2012, 12 pages.
Farber et al., "SAP HANA Database—Data Management for Modern Business Applications", SIGMOD Record, dated Dec. 2011, vol. 40, No. 4, 8 pages.
Khalid Sayood:, "Introduction to data Compression", Morgan Kaufmann Publisher, dated Dec. 1996, 4 pages.
Antoni Cau, et al., "Specifying Fault Tolerance within Stark's Formalism," 1993, IEEE, pp. 392-401.
IBM Corp., "IBM OS/2 Extended Edition Configuration," Feb. 1990, IBM Technical Disclosure Bulletin, vol. 32, No. 9B, pp. 446-451.
Alapati, S., Backing Up Databases. In: Expert Oracle Database 11g Administration, Apress, dated 2009, pp. 1-70.
Yang, U.S. Appl. No. 15,266,375, filed Sep. 15, 2016, Office Action, dated Oct. 31, 2019.

(56) References Cited

OTHER PUBLICATIONS

Guirguis, U.S. Appl. No. 15/610,171, filed May 31, 2017, Office Action, dated Sep. 12, 2019.
Li, U.S. Appl. No. 15/339,525, filed Oct. 31, 2016, Interview Summary, dated Jul. 31, 2019.
Werner Vogels, "Eventually Consistent", CACM, dated Dec. 19, 2007, 4 pages.
V Sikka et al, Efficient Transaction Processing in SAP HANA Database: the End of a Column Store Myth, SIGMOD dated 2012, 11 pages.
Oracle® Flashback Technologies, http://www.oracle.com/technetwork/database/features/availability/flashback-overview-082751.html, last viewed on Dec. 5, 2019, 3 pages.
Oracle® TimesTen In-Memory Database and TimesTen Application-Tier Database Cache, www.oracle.com/technetwork/database/database-technologies/timesten/overview/index.html, viewed on Dec. 5, 2019, 1pg.
Oracle Help Center, Oracle® TimesTen Application-Tier Database Cache User's Guide: Read-only Cache Groups, http://stdoc.us.oracle.com/12/12102/TTCAC/define.htm#TTCAC211, viewed on Dec. 5, 2019, 10 pages.
Ma et al., On benchmarking online social media analytical queries. In First International Workshop on Graph Data Management Experiences and Systems (GRADES '13). ACM, Article, dated 2013, 7 pages.
Labrinidis et al., "Balancing Performance and Data Freshness in Web Database Servers", VLDB dated 2003, 12 pages.
Jeff Erickson, In-Memory Acceleration for the Real-Time Enterprise,http://www.oracle.com/us/corporate/features/database-in-memory-option/index.html, last viewed on Dec. 5, 2019, 4 pages.
Gary Marchionini, Exploratory Search: From Finding to Understanding. Communications. ACM 49, 4, dated Apr. 2006, pp. 41-46.
Oracle, "Oracle® TimesTen Application-Tier Database Cache", Users Guide, Release 18.1, Dated Nov. 2019, 230 pages.
Oracle Help Center, "TimesTen Application-Tier Database Cache Introduction", dated 2012, 10 pages.
Krishnaswamy, U.S. Appl. No. 15/253,780, filed Aug. 31, 2016, Final Office Action, dated May 14, 2020.

\* cited by examiner

602: MAINTAIN, ON PERSISTENT STORAGE, A FIRST DATABASE THAT IS ACCESSIBLE TO A FIRST DATABASE SERVER, WHEREIN SAID FIRST DATABASE INCLUDES A SET OF PF DATA, STORED ON SAID PERSISTENT STORAGE, IN A PERSISTENT FORMAT

604: CONVERT SAID SET OF PF DATA TO A MIRROR FORMAT TO PRODUCE A SET OF MF DATA, AND STORING SAID SET OF MF DATA WITHIN VOLATILE MEMORY, WHEREIN SAID MIRROR FORMAT IS DIFFERENT FROM AND INDEPENDENT OF SAID PERSISTENT FORMAT

606: MAINTAIN A PARTICULAR POOL OF ALLOCATED MEMORY CHUNKS COMPRISING A PLURALITY OF ALLOCATED MEMORY CHUNKS THAT ARE ALLOCATED FROM A PARTICULAR AREA OF MEMORY THAT IS ACCESSIBLE TO THE FIRST DATABASE SERVER, AND THAT IS DEDICATED TO ONE OR MORE POOLS OF MEMORY CHUNKS INCLUDING THE PARTICULAR POOL OF ALLOCATED MEMORY CHUNKS

608: RECEIVE, BY SAID FIRST DATABASE SERVER, ONE OR MORE CHANGE RECORDS FROM A SECOND DATABASE SERVER, SAID ONE OR MORE CHANGE RECORDS INDICATING A PARTICULAR TRANSACTION PERFORMED AGAINST A SECOND DATABASE, AND APPLY A FIRST CHANGE RECORD OF THE ONE OR MORE CHANGE RECORDS TO SAID SET OF PF DATA

610: ALLOCATE A PARTICULAR MEMORY SLAB, FROM A PARTICULAR MEMORY CHUNK OF THE PLURALITY OF ALLOCATED MEMORY CHUNKS, TO STORE A TRANSACTION METADATA STRUCTURE FOR THE PARTICULAR TRANSACTION

612: STORE TRANSACTION METADATA DERIVED FROM THE FIRST CHANGE RECORD WITHIN THE TRANSACTION METADATA STRUCTURE STORED IN THE PARTICULAR MEMORY SLAB

SPACE MANAGEMENT FOR TRANSACTIONAL CONSISTENCY OF IN-MEMORY OBJECTS ON A STANDBY DATABASE

CROSS-REFERENCE TO RELATED APPLICATION

This application claims the benefit, under 35 U.S.C. § 120, as a Continuation-in-part of U.S. patent application Ser. No. 15/253,780, titled "Query Execution Against An In-Memory Standby Database", filed Aug. 31, 2016, which claims the benefit, under 35 U.S.C. § 119(e), of Provisional Application No. 62/245,443, filed Oct. 23, 2015, the entire contents of each of which is incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

Embodiments relate to database systems and more specifically, to memory management for query execution against an in-memory standby database.

BACKGROUND

In case of data corruption or system failure at a primary database, a copy of the primary database may be maintained as a separate database known as a standby database. Thus, if the primary database fails, a failover to the standby database may be performed. Typically, the primary database and the standby database are maintained in separate database systems that are remotely connected. Maintaining consistency between the primary database and the standby database involves replicating changes to the primary database on the standby database.

Furthermore, a database may reside in main memory and/or on disk. A growing trend is to execute queries against main memory databases known as in-memory databases. Typically, all or part of a disk-based database is stored in main memory for relatively faster access to data. Additionally or alternatively, data may be stored in main memory in a different and independent format from data stored on disk. For example, data may be stored on disk in a row-based format, whereas data may be stored in main memory in a column-based format.

Hereinafter, a format in which data is stored on disk is called a persistent format (PF), and a different format in which data is stored in main memory is called a mirror format (MF). Thus, PF data is stored in persistent storage and/or a cache of persistent storage data. In contrast, MF data is stored in main memory separately from any cache of PF data. Advantageously, certain operations, such as vector processing, may be more efficiently performed over MF data as opposed to over PF data.

Because the standby database maintains a copy of the primary database, the standby database is an excellent candidate for sharing some of the primary database's workload. For example, read-only queries may be executed against the standby database instead of against the primary database so that the primary database is available for queries that update the database data. Also, a standby database may maintain MF data in a manner similar to the primary system. The MF data maintained by a standby database is generally not kept in synch with the MF data being maintained by the primary database. In other words, the standby database converts PF data to MF data in any way that enables faster query execution on the standby system.

Maintenance of MF data on a standby database requires maintaining the MF data transactionally consistent with the PF data based on the change records being received from the primary database. Furthermore, a reference timestamp that indicates a time at which the standby database is current with the primary database is generally advanced in discrete steps. As such, for purposes of maintaining the MF data transactionally consistent with the PF data on the standby database, it becomes necessary for the standby system to buffer records from transactions being committed on the primary system until the reference timestamp for the standby database advances to a higher value than the commit timestamp of the buffered transactions.

Such operations on a standby system involve diverse patterns of demand for processing power and storage, which poses significant challenges in memory management for standby systems to ensure that maintaining the MF data is performed efficiently. Because buffering transaction data involves transactions of a wide range of sizes, storage management and preventing fragmentation is a particular problem given the wide range of memory size needs. Also, such standby databases face scalability issues in that hundreds of processes, potentially across multiple database server instances implementing the standby system, could be mining change records from the primary database and also buffering the records from transactions simultaneously.

Furthermore, many transactions perform operations on the same set of blocks multiple times, resulting in the potential for redundancy among the buffered records and inefficiency in applying those buffered records to the MF data. Also, immediate garbage-collecting after freeing of memory chunks can lead to thrashing of memory allocations, especially when the workload peak utilization is unstable and frequently fluctuates, as is common in standby databases.

As such, it would be beneficial to manage memory and resources, for a standby system that supports MF data, to allow for scalable and efficient use of storage resources without significantly retarding the application of change records to the PF data of the standby database.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 6 depicts a flowchart for implementing memory management on a standby database system that maintains mirror format data in volatile memory.

DETAILED DESCRIPTION

Figure 1:
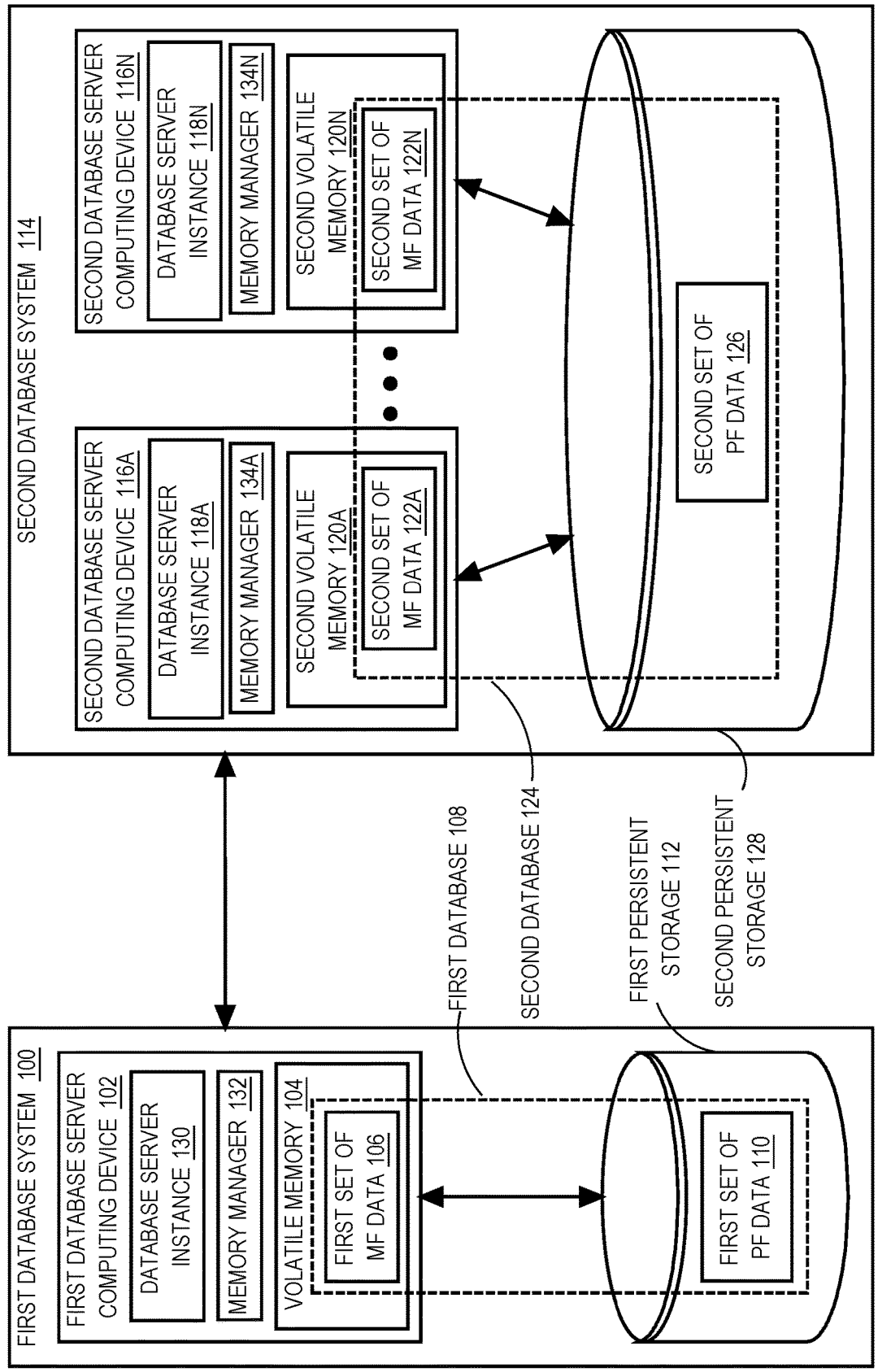
FIG. 1 depicts example primary and standby database systems on which embodiments may be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A standby database system that maintains both PF data and MF data must maintain transactional consistency for the MF data. To this end, when a primary database system sends change records to the standby database system, the standby database system buffers transaction metadata describing transactions, indicated in the change records, in a transaction log. The standby database system uses the transaction log to invalidate appropriate portions of the MF data in order to keep the MF data transactionally consistent with the PF data.

Embodiments address memory and resource management issues that arise in connection with keeping MF data of a standby database transactionally consistent with the PF data in the standby database. Specifically, embodiments store transaction metadata in dedicated pools of allocated memory chunks, which reduces memory allocation thrashing. Furthermore, portions of the pools of allocated memory chunks are dedicated to the respective apply slave processes that mine and process change records coming from the primary database system. As such, many administrative tasks are performed without requiring processes to wait for repeated memory allocations, and/or synchronization of memory access with other processes. Also, the pools of allocated memory chunks are anchored within the structure of a transaction log such that buffering and application of metadata for one transaction does not block required buffering and application of metadata for other transactions. Such efficient utilization of collective memory resources leads to servicing more MF data per unit of memory provisioned.

According to embodiments, the standby database system pre-processes transaction metadata in preparation for application of the metadata to invalidate appropriate portions of MF data. Further, embodiments divide the work of pre-processing records storing the transaction metadata among the many apply slave processes that create the records. This division of labor and pre-processing of transaction metadata helps prevent the process of maintaining the MF data transactionally consistent with the PF data from retarding the advancement of the reference timestamp of the standby database.

According to further embodiments, a garbage collection algorithm avoids thrashing of memory allocation operations amidst fluctuating workload peaks by selecting memory chunks for garbage collection in reverse order of how the chunks were allocated. Thus, embodiments have stable in-memory performance during fluctuating workload peaks.

Finally, according to embodiments, a deduplication algorithm ensures that typically only a single invalidation message per block is applied to invalidate MF data, thus drastically reducing network traffic and transaction metadata processing costs.

Maintaining Consistency Between Databases

Maintaining consistency between the primary database and the standby database involves replicating changes to the primary database on the standby database. Typically, the primary database and the standby database are maintained in separate database systems that are remotely connected. For example, FIG. 1 depicts multiple database systems that are communicatively coupled. Referring to FIG. 1, first database system 100 maintains first database 108, and second database system 114 maintains second database 124. In some example embodiments, first database 108 and second database 124 correspond to the standby database and the primary database, respectively.

Figure 2:
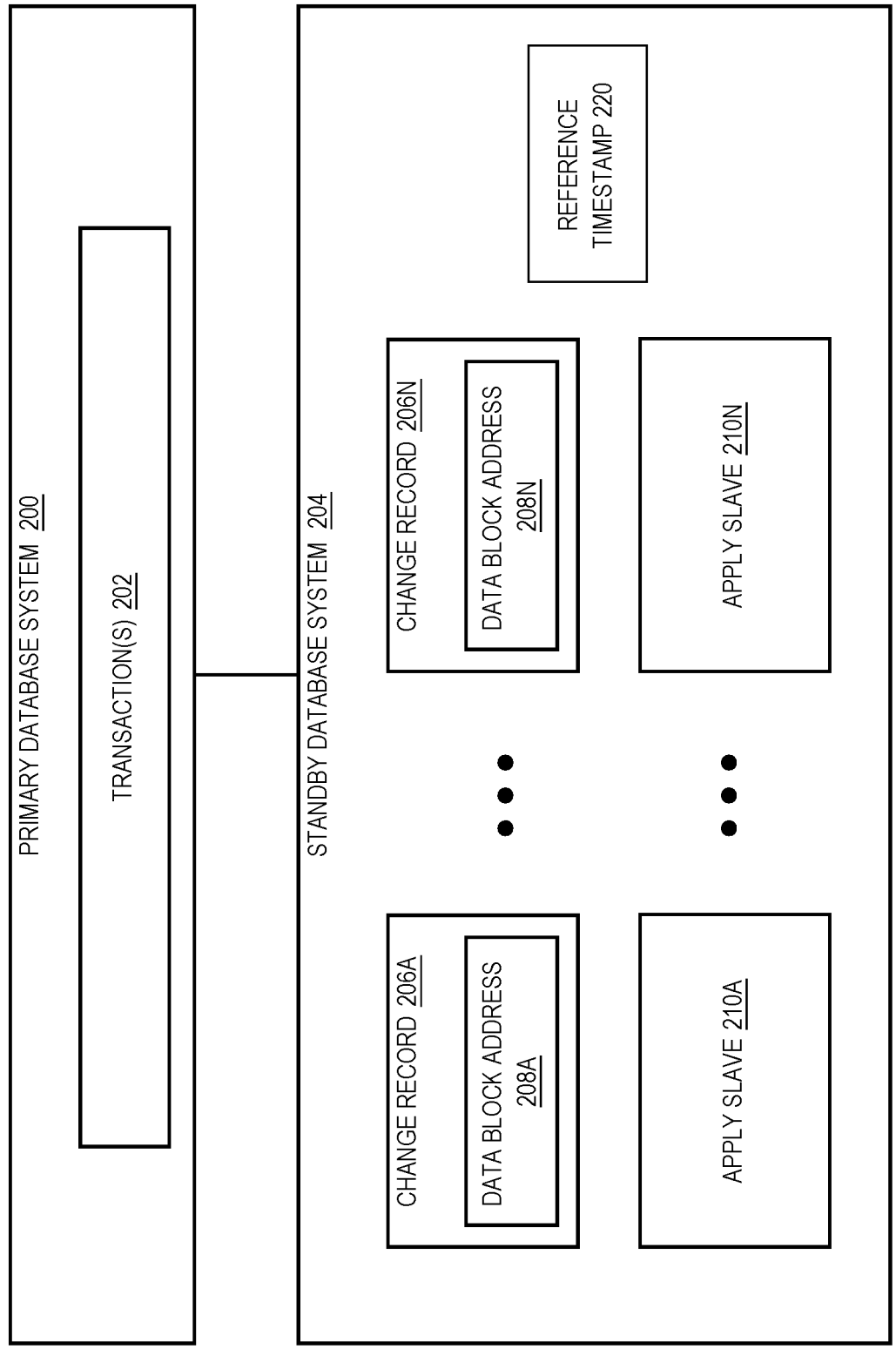
FIG. 2 is a block diagram that depicts an approach for maintaining consistency between multiple databases.

Furthermore, FIG. 2 is a block diagram that depicts an approach for maintaining consistency between multiple databases. Referring to FIG. 2, primary database system 200 is communicatively coupled to standby database system 204. For example, primary database system 200 corresponds to second database system 114, and standby database system 204 corresponds to first database system 100.

Transaction(s) 202 implement one or more changes to the primary database. Primary database system 200 records the one or more changes in change records 206A-N, which are sent to standby database system 204 for replication. Example change records include redo records or redo information as described in U.S. patent application Ser. No. 11/818,975, filed Jan. 29, 2007; U.S. patent application Ser. No. 12/871,805, filed Aug. 30, 2010; U.S. patent application Ser. No. 13/161,315, filed Jun. 15, 2011; and U.S. patent application Ser. No. 14/337,179, filed Jul. 21, 2014, the entire contents of each of which are incorporated herein by reference.

Each transaction, of the one or more transaction(s) 202, implements one or more changes to the primary database based on one or more instructions that are processed as a respective single logical operation. For example, the Structured Query Language (SQL) commands "INSERT", "UPDATE", and "DELETE" may be multiple operations that are processed as a single transaction. Any changes implemented by a particular transaction are persisted when the particular transaction commits. A transaction that fails to commit may undergo a "rollback" operation that restores a previous version of data.

When a transaction is committed at a primary database, a current system change number (SCN) of the primary database increases. A SCN represents a logical timestamp that corresponds to a particular state of the primary database. For example, when a particular transaction begins, the current SCN of the primary database is at "1". At the time that the particular transaction is to commit, the SCN of the primary database is at "5", i.e., because of other transactions that have been processed and, consequently, caused advancement of the system SCN during the time that the particular transaction was being processed. When the particular transaction commits, the primary database system advances the current SCN for the primary database system to "6".

Change records 206A-N specify one or more changes made by transaction(s) 202 performed against a primary database. Primary database system 200 may stream change records 206A-N to standby database system 204. According to an embodiment when the primary database is a clustered database, (where second database system 114 is an example of a clustered database), each instance of the clustered primary database sends, to standby database system 204, one or more of change records 206A-N. According to this embodiment, standby database system 204 merges change records 206A-N received from the instances of the clustered primary database system and sorts change records 206A-N in an increasing SCN order.

In some example embodiments, change records 206A-N include data block addresses 208A-N. A data block is an atomic unit of data that a database server may request to read from and write to a storage device that stores table data in, for example, a block-mode disk storage device. In order to retrieve a row from a storage device, a data block containing the row is read into a cache and the data block must be further examined to access the row.

According to embodiments, a data block corresponds to a predetermined number of bytes of physical storage space. For example, a cache stores data in data blocks that each correspond to two kilobytes of disk space. Each change record includes a data block address that indicates a location of a particular data block in primary database system 200 and/or standby database system 204. The location may be a relative location (i.e., indicated by an RDBA) of the particular data block at which a change occurred in the primary database. Since the standby database is a replica of the primary database, the location may also be a relative location of the particular data block at which a change is to occur in the standby database.

In some example embodiments, standby database system 204 includes apply slaves 210A-N, which are processes that apply changes indicated in change records 206A-N to corresponding data blocks in the standby database. Standby database system 204 allocates change records 206A-N among apply slaves 210A-N, e.g., based on data block addresses 208A-N. To illustrate, standby database system 204 allocates, to apply slave 210A, any change records to be applied in the data block address range of 100 to 500, and system 204 allocates, to apply slave 210B, any change records to be applied in the data block address range of 501 to 700. In some example embodiments, change records 206A-N are allocated among apply slaves 210A-N based on a hash of data block addresses 208A-N.

Executing Queries Against a Standby Database

Since the standby database maintains a copy of the primary database, the standby database is an excellent candidate for sharing some of the primary database's workload. For example, read-only queries may be executed against the standby database instead of the primary database so that the primary database is available for more queries that perform data updates.

However, the standby database typically lags behind the primary database, because the standby database replicates changes that are already implemented at primary database system 200. In other words, the standby database's state is continuously catching up to the primary database's state. As such, standby database system 204 maintains a reference timestamp 220 that records the standby database's latest-readable SCN.

Specifically, because apply slaves of the standby database system work in parallel to apply change records to the standby database, transactions may be applied to the standby database in an order that never occurred within the primary database. For example, at the time that the reference timestamp of the standby database is "10", two apply slaves divide the work of applying two different transactions that committed within the primary database at SCN "11" and SCN "12", respectively. The transaction that committed at SCN "12" (i.e., "T12") includes significantly less operations than are included in the transaction that committed at SCN "11" (i.e., "T11").

Because of the size difference between T11 and T12, the apply slaves complete application of the change records for T12 far faster than the apply slaves can complete T11. If the standby database were to allow the changes made by T12 to be exposed before T11 is completely applied to the database, the standby database would effectively be in a state that never existed in the primary database. Therefore, the standby database system does not advance the reference timestamp to "12" until both T11 and T12 have been applied in full to the standby database Reference timestamp 220 necessarily lags behind the current SCN of primary database system 200. For example, when the primary database's current SCN is at 100, reference timestamp 220 is at 75, and when the primary database's current SCN advances to 120, reference timestamp 220 has advanced to 100. A difference in SCNs between the primary database's current SCN and reference timestamp 220 may not remain constant. This is because the reference timestamp 220 depends on which change records have been applied to standby database system 204. In other words, reference timestamp 220 indicates a latest reference point as of which data in the standby database may be read by a query, because the data in the standby database is consistent with data in the primary database as of that reference point.

Figure 3:
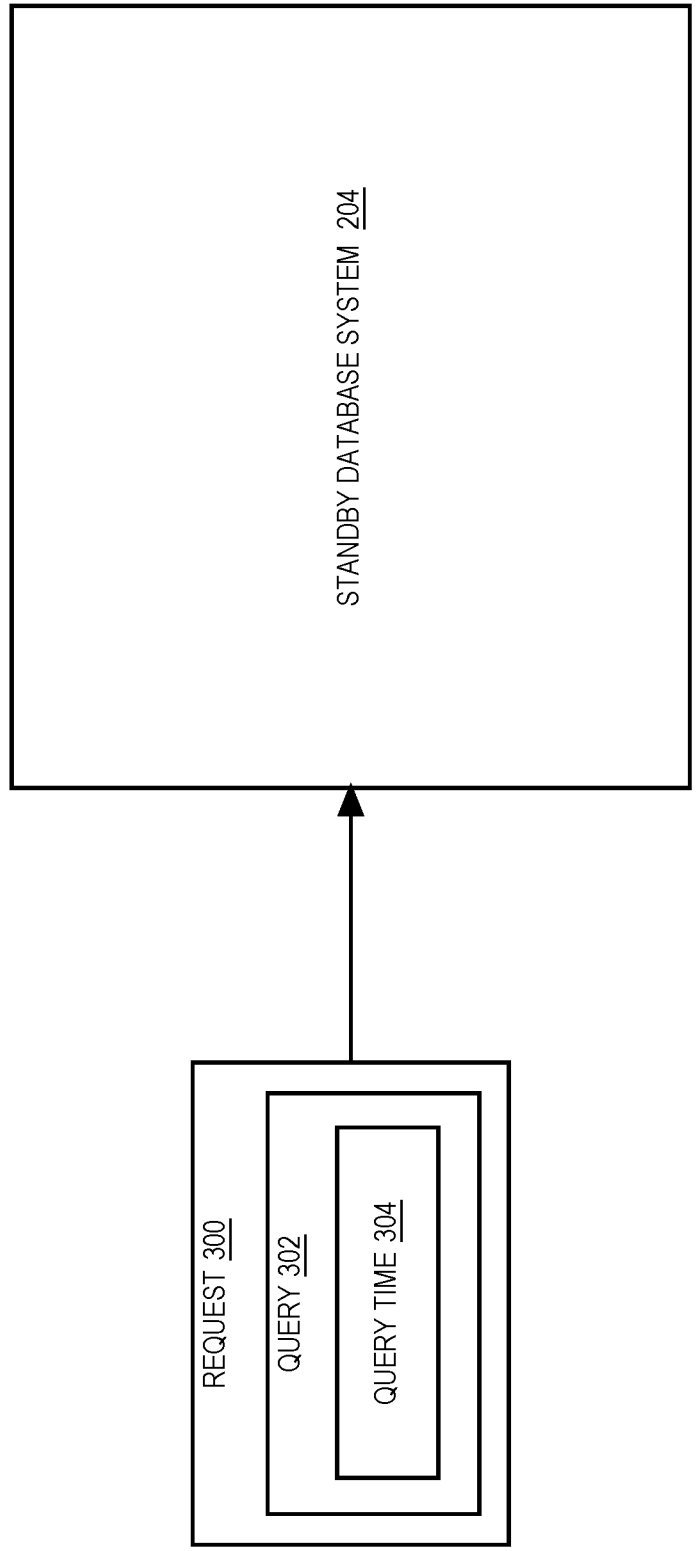
FIG. 3 depicts an example request to execute a query.

Whether the data retrieved is MF data and/or PF data depends on whether all or part of the data corresponds to an invalid data block. Valid data blocks may be read from MF data, whereas invalid data blocks are read from PF data. Thus, prior to executing a particular query against the standby database, standby database system 204 determines whether executing the particular query against the primary database would yield a result that is consistent with executing the particular query against the standby database. FIG. 3 depicts an example request to execute a query. Referring to FIG. 3, standby database system 204 receives request 300 to execute query 302, which corresponds to query time 304 as of which query 302 is to be executed.

Standby database system 204 determines whether to retrieve data for query 302 based on comparing reference timestamp 220 to query time 304. If query time 304 references a time that is earlier than or equal to reference timestamp 220, standby database system 204 retrieves data for query 302. Otherwise, standby database system 204 delays executing query 302 until reference timestamp 220 references a time that is greater than or equal to query time 304.

For example, query 302 corresponds to a query time of SCN 100, but reference timestamp 220 is 75. Because the query time 304 of query 302 is more advanced than reference timestamp 220, standby database system 204 delays executing query 302. Subsequently, as further change records 206A-N are applied to the standby database system 204, reference timestamp 220 advances to 100. Once reference timestamp 220 advances to at least the query time 304 (i.e., 100) of query 302, standby database system 204 can execute query 302.

Figure 4:
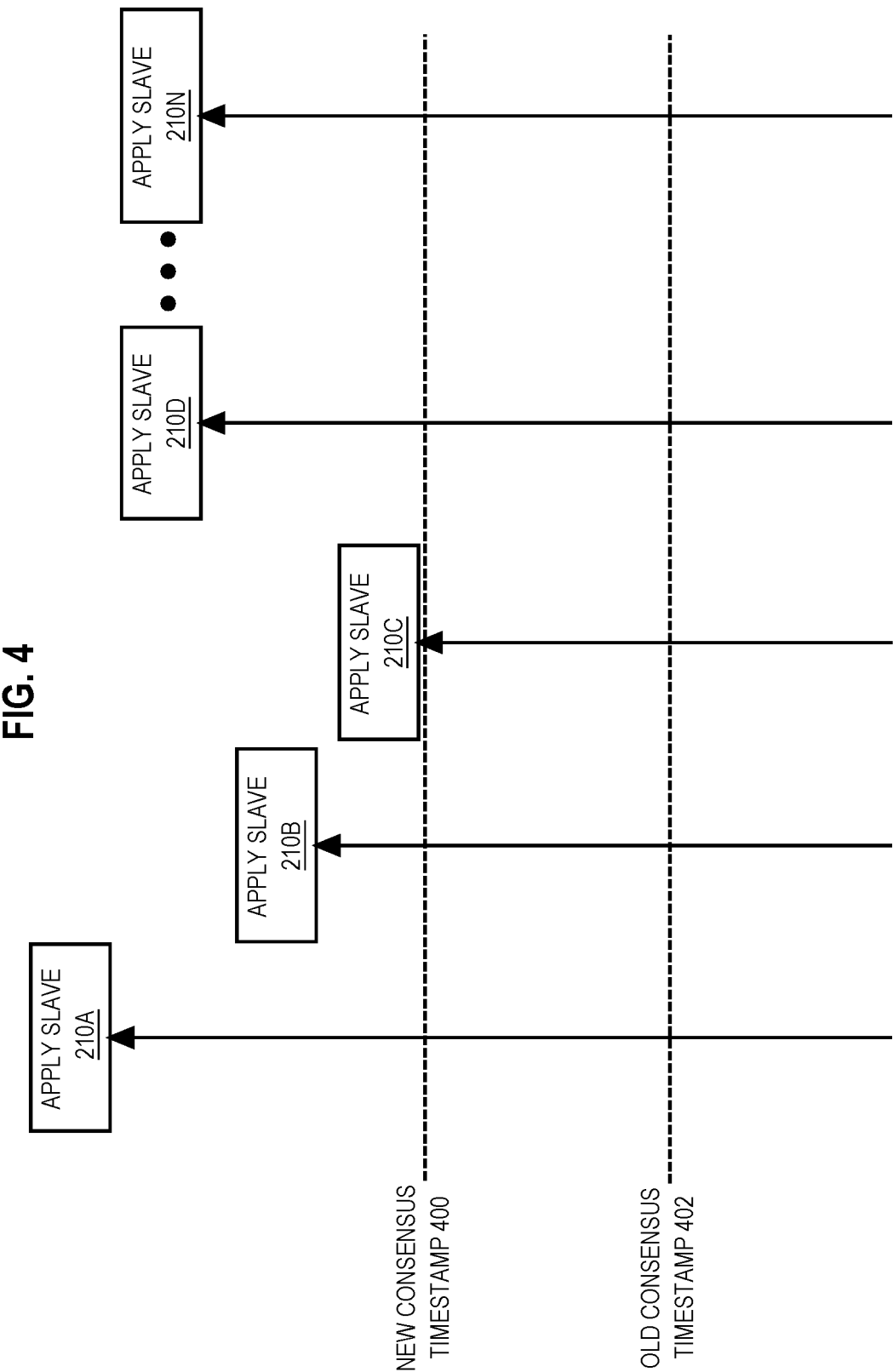
FIG. 4 depicts an approach for determining a reference timestamp for parallel processes.

In some example embodiments, reference timestamp 220 is a consensus timestamp of apply slaves 210A-N. FIG. 4 depicts an approach for determining consensus reference timestamp 220 based on multiple apply slave processes. Referring to FIG. 4, each of apply slaves 210A-N corresponds to a respective SCN that advances as one or more change records are applied to a particular data block address range associated with the respective apply slave process.

For example, at a given point in time, apply slave 210A is at SCN 120, apply slave 210B is at SCN 100, and apply slave 210C is at SCN 75. According to embodiments, a consensus timestamp for apply slaves 210A-N at the given point in time is a minimum SCN value of the SCN values associated with the respective processes. Thus, consensus timestamp 400 corresponds to the SCN of apply slave 210C, which is the earliest of the respective SCNs for the apply slave processes.

As SCNs of apply slave processes advance, so does the consensus timestamp for the apply slave processes. To illustrate in FIG. 4, old consensus timestamp 402 advances to become new consensus timestamp 400 when a lagging apply slave process's SCN advances. For example, apply slave 210B's SCN advanced from SCN 50 to SCN 100, thereby enabling new consensus timestamp 400 to become equivalent to apply slave 210C's SCN of 75.

Recording Changes to MF-Enabled Data

When standby database system 204 receives change records 206A-N from primary database system 200, a subset of change records 206A-N include an indication that particular changes affect MF data at standby database system 204. As used herein, a subset may be all or part of a set. For example, each change record includes a bit flag in header data indicating that a change occurred for "MF-enabled" data, where "MF-enabled data" refers to PF data that can be stored in mirror format.

Figure 5:
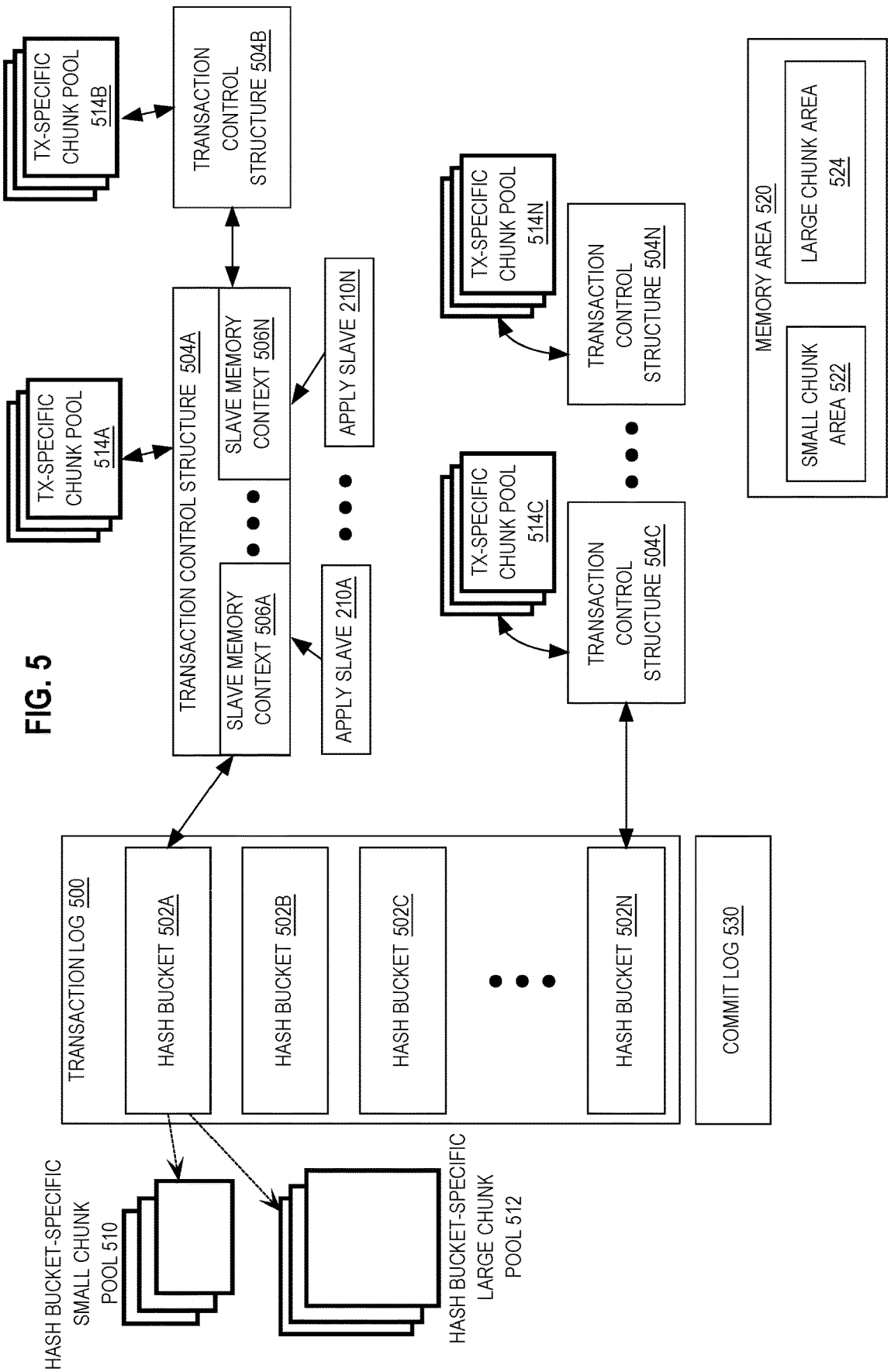
FIG. 5 is a block diagram that depicts a transaction log that records metadata about change records being applied to data of a standby database system.

Because standby database system 204 maintains MF data in memory to aid in executing queries over the standby database, and does not necessarily maintain the same MF data as is maintained in primary database system 200, standby database system 204 maintains a record of changes to MF-enabled data, such as transaction log 500 of FIG. 5. Transaction log 500 is a global record of changes that affect MF data at standby database system 204, and is stored in memory and/or on disk accessible to a database server instance implementing standby database system 204. If standby database system 204 is a clustered database system, a particular instance of standby database system 204 maintains transaction log 500.

Standby database system 204 buffers transaction metadata, received in change records 206A-N from primary database system 200, to enable the standby system to maintain the MF data transactionally consistent with the PF data. As such, from change records 206A-N, standby database system 204 extracts transaction metadata that includes one or more of: a transaction identifier, a relative data block address (RDBA) of data that was affected by an operation recorded in the change record, an indicator that the transaction has committed, a timestamp associated with the operation, and/or any other transaction metadata.

In some example embodiments, standby database system 204 includes a plurality of apply slaves 210A-N that process change records being received from primary database system 200. According to an embodiment, each apply slave process is assigned a particular range of RDBAs, and the apply slaves mine the stream of change records being received from the primary system to identify change records with RDBAs that fall within the apply slaves' respective ranges. Each of apply slaves 210A-N work in parallel to apply the change records to PF data maintained by standby database system 204.

When applying a given change record, an apply slave also generates an invalidation record with information extracted from the given change record and stores the invalidation record in transaction log 500, as described in detail below. In the example of FIG. 5, transaction log 500 is a hash table that includes hash buckets 502A-N, and each hash bucket stores a set of transaction control structures storing metadata for a corresponding set of transactions, including invalidation records.

Each transaction control structure is a container for information about a particular transaction. When applying change records to the standby database, a given apply slave process (such as apply slave 210A) does not know whether a given transaction will modify MF data until such time that the change records indicate such a change or that the transaction has committed without making a change that affects the MF data. As such, as described in further detail herein, standby database system 204 maintains state (i.e., a transaction control structure) for every transaction indicated in the change records. Recording operations that each transaction performs within the transaction control structure for each respective transaction allows standby database system 204 to quickly have access to the operations for any given transaction. The buffered transaction metadata from transaction log 500 allows standby database system 204 to quickly invalidate any applicable MF data when required for a given committed transaction.

Each hash bucket in transaction log 500 corresponds to zero or more transaction control structures 504A-N. According to the embodiment depicted in FIG. 5, off of hash bucket 502A, there is a doubly linked list of transaction control structures 504A-B. Each of transaction control structures 504A-N corresponds to a distinct transaction and includes a respective transaction identifier that identifies the corresponding transaction. Standby database system 204 creates a new transaction control structure for a previously unknown transaction upon applying the first change record that corresponds to the previously unknown transaction. For example, a transaction A involves data manipulation language (DML) operations A-B. If standby database system 204 first encounters DML operation B and then encounters DML operation A, standby database system 204 creates a transaction control structure for Transaction A upon encountering DML operation B.

In some example embodiments, apply slaves 210A-N create the transaction control structures needed to store transaction metadata. According to one or more embodiments, to avoid multiple transaction control structures that each correspond to a single transaction, creation of transaction control structures is governed by per hash bucket lock (such as a space-latch). More specifically, a transaction control structure anchored to a particular hash bucket is created and edited by a process that has obtained the lock for the particular hash bucket.

Continuing with the previous example, apply slave 210A and apply slave 210B simultaneously encounter DML operation A and DML operation B, respectively. Apply slave 210A first obtains the lock associated with hash bucket 502A to create a transaction control structure. Apply slave 210A then determines whether a transaction control structure currently exists for transaction A. In response to determining that such a transaction control structure does not exist, apply slave 210A creates a transaction control structure for Transaction A. When apply slave 210B subsequently obtains the lock associated with hash bucket 502A to create a transaction control structure, apply slave 210B determines that a transaction control structure currently exists for transaction A and, in response, uses the lock to make any needed edits to the existing transaction control structure.

The standby database system 204 adds the new transaction control structure to the hash bucket of transaction log 500 identified by the hash of the transaction identifier for Transaction A. For example, apply slave 210A determines that the transaction identifier for Transaction A hashes to hash bucket 502A. Apply slave 210A adds the new transaction control structure to the end of the linked list of transaction control structures anchored at hash bucket 502A. When apply slave 210B must add information for operation B to the new transaction control structure, apply slave 210B performs the hash function on the transaction identifier for Transaction A, which hashes to hash bucket 502A. Apply slave 210B traverses the linked list anchored at hash bucket 502A until the process comes across the transaction control structure for Transaction A.

Invalidating MF Data

Standby database system 204 periodically advances reference timestamp 220, which is used to determine whether a query may be executed against a current state of a standby database. When reference timestamp 220 advances, standby database system 204 invalidates any MF data that was modified by a committed transaction that committed between the previous reference timestamp and the current reference timestamp.

Invalid MF data is MF data that has become stale because the current version of the corresponding PF data has changed from the version of the MF data. According to an embodiment, MF data is invalidated rather than updated because MF data is stored in a compressed form and updating the MF data would require decompressing the data to be updated and then re-compressing the updated MF data. Such compression processing can be prohibitively expensive while marking the data as invalid is a relatively inexpensive procedure. Because MF data is represented within the database elsewhere, i.e., in PF data that is potentially stored in a cache, invalidation of the MF data does not result in loss of data.

Furthermore, loading MF data into main memory involves at least as much computational overhead as retrieving corresponding PF data. Thus, standby database system 204 loads updated MF data into main memory on a periodic basis, and any given MF data is associated with a timestamp (such as an SCN) that indicates the time at which the MF data is consistent with the standby database.

According to one or more embodiments, between loadings, standby database system 204 marks as invalid (and, therefore, unreadable) any MF data that was changed by a committed transaction. Specifically, standby database system 204 waits to invalidate MF data until the transaction that made changes to the MF data is committed and the reference timestamp of the standby database progresses past the SCN of the transaction. In this way, the MF data is maintained as readable until the changes that caused the MF data to be stale are made available within the standby database. Such a practice keeps the MF data available, for queries, for as long as possible thereby increasing the value of the MF data.

To preserve MF data—which corresponds to PF data that has been changed by a transaction—until the reference timestamp progresses past the SCN of the transaction, transaction log 500 stores invalidation records, being produced based on change records that apply slaves apply to the standby database. Thus, the transaction control structures within transaction log 500 track the changes being made based on change records for respective transactions. At the time that the changes made to PF data by one or more particular transactions are exposed within the standby database by advancement of the reference timestamp, the standby database system applies, to the MF data, the changes buffered within transaction log 500 that correspond to the one or more particular transactions.

A transaction control structure that includes a commit operation corresponds to a committed transaction. According to an embodiment, standby database system 204 scans transaction control structures 504A-N for commit operations to determine which transactions have committed. According to another embodiment, standby database system 204 efficiently determines which transactions have committed based on a commit log 530 in which standby database system 204 stores information about committed transactions. Such information includes one or more of transaction identifiers and/or addresses of data blocks affected by operations involved in the committed transactions. Since invalid MF data is stale, standby database system 204 instead reads PF data that corresponds to the invalid MF data, because PF data is continuously updated within standby database system 204.

According to one or more embodiments, invalidating MF data involves modifying metadata that describes the MF data, where standby database system 204 maintains such metadata in a data structure, such as a bitmap. For example, a bitmap includes bits that each correspond to separate MF data stored at corresponding data block addresses in main memory of standby database system 204. For example, a first invalidation bit corresponds to MF data converted from PF data at RDBA "110". Thus, invalidating MF data that is the converted version of PF data at RDBA "110" involves flipping the particular bit in the bitmap (i.e., changing the bit from '0' to '1'). In this case, a bit of '0' indicates that the corresponding MF data is valid, and a bit of '1' indicates that the corresponding MF data is invalid.

In some example embodiments, reference timestamp 220 is a consensus timestamp of apply slaves 210A-N, as described in connection with FIG. 4. Thus, multiple transactions may have committed between an old consensus timestamp 402 and a new consensus timestamp 400 depicted in FIG. 4. Consequently, standby database system 204 may perform MF data invalidation for multiple committed transactions in a batch.

If standby database system 204 is a clustered database system, then a given instance of the cluster broadcasts its MF data invalidations to other instances via an interconnect. For example, the MF data invalidations are broadcast according to a publish-subscribe message pattern. Each of the other instances of the cluster applies the MF data invalidations to local versions of the invalidation bitmap.

Memory Management

Embodiments provide efficient memory management for maintaining transactional consistency of MF data on a standby database for a wide range of transaction sizes. For example, many transactions are short, modifying a few rows within a given data block, and other transactions modify a large amount of data involving hundreds of data blocks. Furthermore, transactions can vary widely in the amount of time that the transactions run. Also, some transactions modify data that is represented as MF data in the standby database, and other transactions do not.

As such, the size of transaction control structures, as well as other structures used to store transaction metadata, vary widely. While the invalidation record for a given operation within a transaction state is small (such as 800B), the transaction control structure itself may be as big at 10K for very large transactions. Embodiments avoid fragmenting of storage resources on standby database system 204, which might be caused by varied memory size requirements, by allocating space for transaction metadata structures on demand, and also by re-using allocated memory chunks for as long as the allocated memory is needed for maintenance of transaction log 500, as described in further detail below.

FIG. 6 depicts a flowchart 600 for implementing memory management on a standby database system that maintains MF data in volatile memory. Specifically, at step 602, a first database is maintained on persistent storage that is accessible to a first database server; wherein said first database includes a set of persistent format data (PF data), stored on said persistent storage, in a persistent format. For example, standby database system 204 is implemented on first database system 100 of FIG. 1. Database server instance 130 maintains first database 108 that includes first set of PF data 110, stored in a persistent format such as row-based format, on first persistent storage 112.

At step 604, said set of PF data is converted to a mirror format to produce a set of mirror format data (MF data), and said set of MF data is stored within volatile memory, wherein said mirror format is different from and independent of said persistent format. For example, according to techniques described in further detail herein, database server instance 130 converts first set of PF data 110 to produce first set of MF data 106 maintained in volatile memory 104 of computing device 102. According to the example, MF data 106 is in column-based format.

Memory Chunk Pools

At step 606, a particular pool of allocated memory chunks is maintained, where the particular pool of allocated memory chunks comprises a plurality of allocated memory chunks that are allocated from a particular area of memory that is accessible to the first database server, where the particular area of memory is dedicated to one or more pools of memory chunks including the particular pool of allocated memory chunks. For example, as depicted in FIG. 5, standby database system 204 maintains one or more pools of memory that have been allocated from a dedicated memory area.

Specifically, FIG. 5 depicts memory chunk pools 510, 512, and 514A-N allocated from memory area 520 (e.g., in volatile memory 104 and/or persistent storage 112) to store metadata structures for transaction log 500. According to one or more embodiments, memory area 520 is in volatile memory 104 and comprises DRAM memory (dynamic random access memory) that is dedicated for storage of the metadata structures for transaction log 500.

Memory area 520 is divided into two dedicated sub-areas, i.e., small chunk area 522 and large chunk area 524. Standby database system 204 allocates fixed-length data chunks from areas 522 and 524 to store metadata structures generated by apply slave processes in connection with maintaining transaction log 500. According to one or more embodiments, standby database system 204 allocates 64KB (kilobyte) chunks of memory from small chunk area 522 and allocates 1MB (megabyte) chunks of data from large chunk area 524 on demand as needed to store control structures transaction log 500. However, other fixed lengths may be chosen for data chunks allocated from one or both of small chunk area 522 and large chunk area 524, according to other embodiments.

Standby database system 204 maintains a respective small chunk pool and a respective large chunk pool for each hash bucket of transaction log 500. FIG. 5 depicts hash bucket 502A with associated hash bucket-specific small chunk pool 510 and hash bucket-specific large chunk pool 512 that store metadata structures anchored at hash bucket 502A (including transaction control structures 504A and 504B and associated slave memory contexts and initial invalidation bundles as described in further detail below). Each other hash bucket 502B-N is associated with both of a respective hash bucket-specific small chunk pool and respective hash bucket-specific large chunk pool that maintain memory chunks being used to store metadata structures anchored at the associated hash bucket. All of the transaction control structures storing metadata for transactions that hash to a given hash bucket are allocated from a memory chunk pool that is associated with the given hash bucket (or from a transaction-specific chunk pool, as described in further detail below).

Allocating Transaction Control Structures

Returning to the discussion of flowchart 600, at step 608, said first database server receives one or more change records from a second database server, said one or more change records indicating a particular transaction performed against a second database; and a first change record of the one or more change records is applied to said set of PF data. For example, database server instance 130 of standby database system 204 receives, from a database server instance of primary database system 200, one or more change records indicating changes that a particular transaction has performed within the database data of primary database system 200. Standby database system 204 by applies the changes, indicated in the change records, to PF data 110 maintained by standby database system 204.

According to one or more embodiments, standby database system 204 creates a transaction control structure within transaction log 500 for every transaction indicated in change records being received from primary database system 200, whether or not the transaction touches PF data that is currently being maintained in MF data within standby database system 204. Because millions of transactions can be initiated per second, transaction control structure allocation needs to be very fast, and scalable. Thus, embodiments take a hierarchical approach to space management for allocation of transaction control structures as described below. As such, according to embodiments, applying a first change record of the one or more change records to said set of PF data comprises steps 610 and 612 of flowchart 600.

At step 610 of flowchart 600, a particular memory slab is allocated, to store a transaction metadata structure for the particular transaction, from a particular memory chunk of the plurality of allocated memory chunks. For example, apply slave 210A determines that an RDBA recorded in a first change record, received from primary database system 200, falls within the range of RDBAs assigned to apply slave 210A. As such, apply slave 210A is tasked with applying the first change record to the PF data maintained by standby database system 204.

In connection with applying the first change record to the PF data, apply slave 210A records the change record in transaction log 500. Specifically, apply slave 210A retrieves, from the first change record, a transaction identifier included in the record. Apply slave 210A hashes the transaction identifier with the hash function for transaction log 500 to identify the hash bucket within transaction log 500 that corresponds to the transaction identifier. For example, the transaction identifier indicated in the first change record corresponds to hash bucket 502A.

Apply slave 210A traverses the linked list of transaction control structures anchored at hash bucket 502A. According to this example, apply slave 210A does not find a transaction control structure with the transaction identifier indicated in the first change record. Thus, apply slave 210A creates a new transaction control structure within a large memory chunk from the hash bucket-specific large chunk pool associated with hash bucket 502A, i.e., large chunk pool 512.

Figure 7:
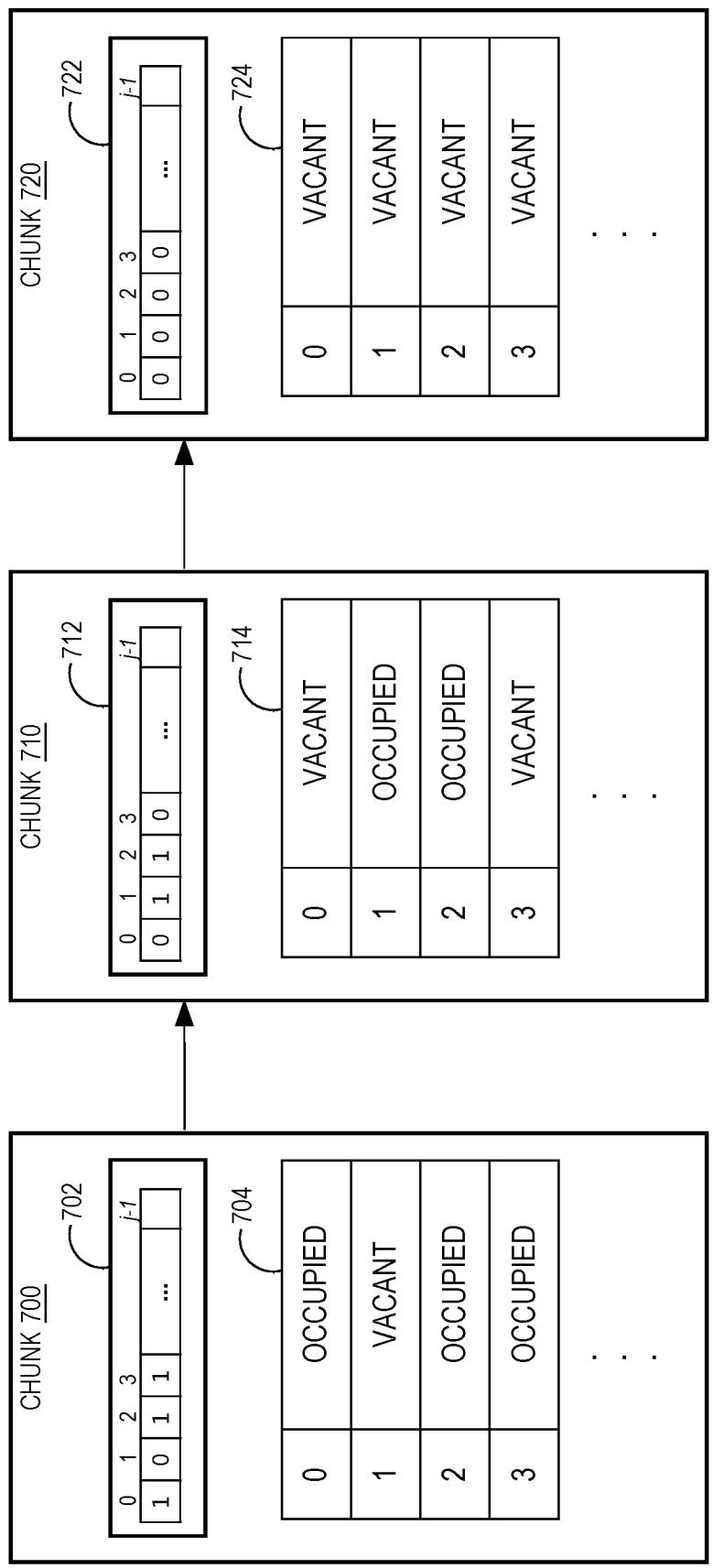
FIG. 7 depicts a pool of memory chunks with bitmaps to indicate free portions of the memory chunks.

FIG. 7 depicts a pool of memory chunks with free space indicators, according to one or more embodiments. As shown in FIG. 7, each chunk in large chunk pool 512 is divided into contiguous fixed-length slabs (see, e.g., slabs 704, 714, and 724) that fill the entirety of the respective chunk, other than any required header. In the case of large chunk pool 512, each slab is configured to hold a single transaction control structure.

Furthermore, each memory chunk in the pool includes a free bit vector (see, e.g., bitmaps 702, 712, and 724 stored in the headers of the respective memory chunks) that indicates which slabs in the respective memory chunk are vacant and which are occupied by a transaction control structure. In the example of FIG. 7, a '1' in a particular slot of a bitmap indicates that the corresponding slab is occupied and a '0' indicates that the corresponding slab is vacant. In FIG. 7, the slabs are labeled with the same indices that are used in the bitmap. However, according to embodiments, such labels need not be materialized in memory because the slabs are naturally numbered by placement of the slabs within the chunk. For example, the fixed size of memory slabs within large memory chunks is 10KB. As such, the first 10KB of a given chunk (i.e., after any header information) is the $0^{th}$ slab, the second contiguous 10KB portion of the chunk is the $1^{st}$ slab, the third contiguous 10KB portion of the chunk is the $2^{nd}$ slab, etc.

Taking the example of FIG. 7 in the context of large chunk pool 512, bitmap 702 indicates that chunk 700 stores a transaction control structure in each of slabs 0, 2, and 3 and slab 1 of chunk 700 is available. Thus, the status of each of the slabs in chunk 700 is reflected in bitmap 702.

Memory is allocated for new transaction control structures by searching within chunks in order of allocation. According to embodiments, slabs are also allocated, from within a given chunk, in order of position of the slab within the chunk, e.g., from first to last. This ordered allocation of memory for transaction metadata keeps the transaction metadata stored in as few memory chunks as possible, keeping the latest allocated chunks as free as possible. Because this technique naturally fills in the gaps left by transaction control structures being released from transaction log 500, fragmentation of memory is kept to a minimum. Furthermore, because memory chunks are re-used as needed, this ordered allocation of memory prevents memory thrashing.

For example, chunk 700 was allocated before chunk 710, which was allocated before chunk 720. Returning to the example presented in connection with step 610 of flowchart 600, apply slave 210A identifies a particular slab from large chunk pool 512 to store the needed transaction control structure by checking the bitmap of each memory chunk in pool 512, in order, starting from the oldest memory chunk, to find a free slab. In the example of FIG. 7, apply slave 210A first checks bitmap 702 of chunk 700 and determines that slab 1 of chunk 700 is available. Thus, apply slave 210A generates a new transaction control structure needed to store the metadata for the first change record within slab 1 of chunk 700 and sets bitmap[1] to '1' to indicate that slab 1 of chunk 700 is occupied.

At step 612, transaction metadata that is derived from the first change record is stored within the transaction metadata structure stored in the particular memory slab. For example, apply slave 210A stores transaction-specific information from the first change record within the new transaction control structure, including at least the transaction identifier.

When all of the chunks in large chunk pool 512 are fully occupied and standby database system 204 requires additional space for transaction control structures, then standby database system 204 allocates a new large chunk from large chunk area 524 and adds the new memory chunk to large chunk pool 512, e.g., at the end of an ordered list of chunks ordered by allocation time.

Allocating Data for Initial Invalidations

Standby database system 204 stores, for a given transaction control structure storing metadata for a given transaction, invalidation records that include information from change records that record operations that were involved in the given transaction. An invalidation record records a corresponding operation and includes one or more of: RDBA(s) of one or more data blocks changed by the recorded operation; and a commit marker that indicates that the associated particular transaction has committed.

The number of operations that any given transaction performs on the database can vary widely. As such, embodiments allocate space for invalidation records, to be stored in transaction log 500, on demand. Many transactions are very small, involving few updates to database data. Thus, according to one or more embodiments, a small amount of memory that is sufficient to store a fixed number of operations (e.g., 20 operations) is allocated for each transaction control structure from the small chunk pool that is associated with the hash bucket that is associated with the respective transaction.

For example, when standby database system 204 creates a transaction control structure, the system also allocates a 1KB memory slab from the associated hash bucket-specific small chunk pool to store an initial invalidation bundle that can store up to 20 invalidation records. An initial invalidation bundle is generated once for each transaction control structure, and this initial invalidation bundle will satisfy the needs of small transactions without additional memory allocations for invalidation records. Any additional invalidation records, beyond the initial 20 that fit in the bundle, are stored in invalidation granules as described in further detail below.

Hash bucket-specific small chunk pool 510 is organized as shown in FIG. 7 as described in connection with large chunk pool 512, except, at least: the memory chunks in pool 510 are small, e.g., 64KB; the slabs in pool 510 are also smaller, e.g., 1KB of memory; and the slabs are used to store initial invalidation bundles. In order to add an invalidation record to an existing initial invalidation bundle, e.g., for transaction control structure 504A, an apply slave obtains the lock associated with hash bucket 502A to give the apply slave rights to edit the invalidation bundle for transaction control structure 504A.

Continuing with the example given in connection with flowchart 600, apply slave 210A stores information from the first change record within an initial invalidation bundle for the new transaction control structure. For purposes of illustration, the new transaction control structure is transaction control structure 504A. Apply slave 210A identifies a vacant slab of memory from small chunk pool 510 using a similar technique as described herein for identifying a slab of memory from large chunk pool 512. Apply slave 210A creates an initial invalidation bundle for structure 504A within the identified slab at least by: storing an invalidation record for the first change record within the slab of memory; creating a reference to the initial invalidation bundle within structure 504A; and marking the slab as occupied.

Because standby database system 204 is able to store a fixed number of operations within the initial invalidation bundle (e.g., up to 20), small transactions will not need to have additional memory allocations in order to record the full number of operations performed by the small transactions. Only when the number of operations performed by a given transaction exceeds the fixed number of operations that the initial invalidation bundle can hold will the system be required to allocate additional memory to store the information for those operations, as described in detail below. Limiting the number of times memory must be allocated for small transactions prevents a measure of fragmentation, at least in connection with the small transactions.

Allocating Memory for Additional Invalidations

Transactions with more operations than the fixed number that can be stored in an initial invalidation bundle require additional memory to store invalidation records. Thus, once the initial invalidation bundle for a given transaction is full, standby database system 204 creates a transaction-specific pool of small memory chunks (see pools 514A-N of FIG. 5) that is associated with the transaction control structure for the given transaction. The apply slaves store additional invalidation records (other than those stored in the initial invalidation bundle) for a given transaction in the transaction-specific pool associated with the transaction control structure for the given transaction.

Also, to avoid bottlenecked write access to transaction control structure 504A for these additional invalidation records, a respective slave memory context (506A-N) is allocated to each respective apply slave process that has been required to write additional invalidation records for transaction control structure 504A. In FIG. 5, slave memory contexts are only depicted in transaction control structure 504A. However, according to one or more embodiments, slave memory contexts are present in any transaction control structure that requires more memory for invalidation records than is provided in the initial invalidation bundle.

Figure 8:
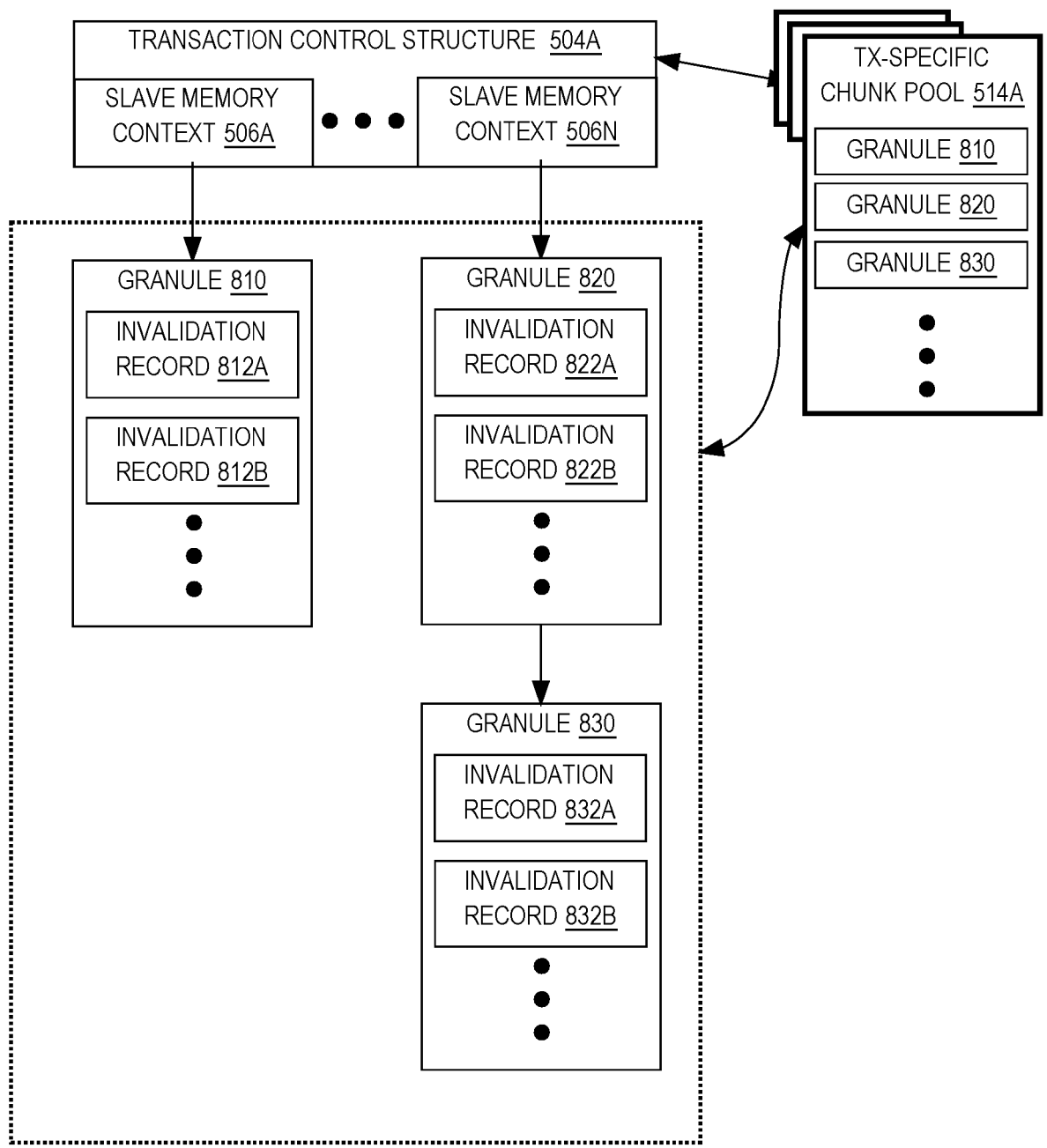
FIG. 8 depicts a transaction-specific pool of memory chunks storing invalidation records.

FIG. 8 depicts an example transaction-specific memory chunk pool 514A associated with an example transaction control structure 504A. As depicted in FIG. 8, each slave memory context 506A-N anchors a respective set of memory granules (e.g., granules 810, 820 and 830) that is being used by the respective apply slave. A memory granule is a fixed-length (e.g., 4KB) portion of memory from a memory chunk in a transaction-specific pool of memory chunks. For example, the size of a granule may be configured based on the size of a network buffer for the system such that a single granule may be transmitted (e.g., to another cluster of a cluster of nodes implementing the standby database system) within a single network packet. According to embodiments, each granule is configured to store 80-100 invalidation records.

Memory granules are allocated on demand to the apply slaves. When an apply slave fills the latest memory granule allocated to the apply slave, standby database system 204 allocates another memory granule for the apply slave's use, which the apply slave adds to the set of memory granules anchored to the apply slave's slave memory context. Concurrent memory granule allocation for multiple apply slaves for the same transaction control structure is synchronized by a per-transaction control structure space latch.

Each memory chunk in a transaction-specific pool of memory chunks is divided into contiguous 4KB granules, where each granule is dedicated memory for a specific apply slave that has been required to store additional invalidation records for the associated transaction control structure. According to embodiments, each slave memory context 506A-N records the one or more locations of the one or more memory granules being used by the associated apply slave. Such locations may comprise a pointer to a source memory chunk within transaction-specific chunk pool 514A and an offset into the chunk that identifies the particular 4KB portion of memory for the granule.

For example, when apply slave 210A first needs to write an invalidation record that does not fit in the initial invalidation bundle associated with transaction control structure 504A, standby database system 204 first creates a slave memory context 506A, for apply slave 210A, within transaction control structure 504A. Standby database system 204 then identifies the next available granule within the latest-allocated memory chunk of transaction-specific chunk pool 514A.

According to an embodiment, transaction-specific memory chunk pool 514A is organized as depicted in, and described in connection with, FIG. 7. According to this embodiment, the header of each memory chunk includes a bitmap that indicates the availability of each contiguous 4KB granule on the memory chunk. Thus, standby database system 204 simply checks the bitmap of the latest-allocated memory chunk from transaction-specific memory chunk pool 514A to determine whether there is available space on the chunk.

If there is space available on the latest-allocated memory chunk of transaction-specific chunk pool 514A, then standby database system 204 records, within slave memory context 506A, a pointer to the latest-allocated memory chunk and an offset that identifies the newly-allocated granule. Apply slave 210A then writes the invalidation record from the recorded offset to the newly-allocated granule. According to an embodiment, the information identifying granules within a slave memory context is stored in a linked list.

When transaction-specific chunk pool 514A is exhausted, standby database system 204 allocates a new chunk from memory area 520, i.e., from small chunk area 522. According to an embodiment, memory chunks from a given transaction-specific memory chunk pool remain in the pool until the corresponding transaction commits. Specifically, when a given transaction commits, after all of its invalidations are flushed (or applied to MF data), all of the memory chunks from the corresponding transaction-specific memory chunk pool are returned in bulk to memory area 520.

Because each granule is dedicated to and controlled by a single apply slave, no synchronization is required for apply slaves to write to these transaction-specific memory chunks. This advantageously allows apply slaves to record invalidation records (other than those stored in the initial invalidation bundle) without the delay of synchronization with the other apply slaves. Because such an operation is relatively common, avoiding synchronization delay conserves resources and allows efficient buffering of transaction metadata. Furthermore, allocating granules to each apply slave on demand balances the need to minimize fragmentation with the need to minimize the amount of time spent allocating memory for the use of the apply slaves.

Pre-Flush Operations

Standby database system 204 utilizes the invalidation records in transaction log 500 to determine which, if any, MF data should be marked as stale (i.e., invalidated) based on committed changes made to corresponding PF data. However, according to one or more embodiments, before a committed transaction's invalidation records can be used to invalidate the appropriate portions of MF data, the invalidation records are transformed to prepare the invalidation records for application to the MF data.

Specifically, standby database system 204 sorts invalidation records, stored in initial invalidation bundles and in transaction-specific memory chunk pools, by the order of the relative data block address (RDBA) of data that was affected by the respective recorded operations. Furthermore, standby database system 204 paginates the sorted invalidation records to hold the only those invalidation records with RDBAs that fall within a pre-determined page range. According to one or more embodiments, to perform such pre-processing efficiently, and avoid slowing down the reference timestamp advancement operation (which drives application of invalidation records to MF data), the following mechanisms are used.

According to embodiments, once each granule, from a transaction-specific memory chunk, is filled with invalidation records, the apply slave that filled the granule automatically sorts the invalidation records within the granule. Thus, the work of sorting invalidations is distributed among many apply slaves working in parallel. Any granules that have not been sorted by the time the invalidation records must be applied to the MF data are sorted at that time.

Also, according to an embodiment, the invalidation records within each granule are paginated such that the invalidation records within a given page of a granule apply to only a limited number of compression units within the MF data. Such pagination aids in effective application of the invalidation records to MF data. For example, after sorting, the invalidation records of a granule with RDBAs ranging more than a pre-determined page range (such as 4096) are paginated so that the invalidation records within each page of the granule do not span more than the pre-determined page range. According to an embodiment, the pre-determined page range may be parameterized such that the system determines the page range based on a parameter provided by an administrator. According to an embodiment, the page range is at most 4096.

Garbage Collection

As indicated above, in the hash-bucket specific memory chunk pools, standby database system 204 fills the memory chunks in order of allocation. Thus, when memory requirements lessen from a relative maximum amount of memory needed to store transaction information, the oldest memory chunks remain in use while the newer memory chunks are naturally drained of data as the memory gets freed in connection with the periodic flushing invalidation records to MF data.

According to one or more embodiments, a garbage collection mechanism searches for memory chunks to release back to memory area 520 that are empty of data (i.e., as shown by the bitmaps in the memory chunk headers) starting with newest memory chunks of a given pool first. Those memory chunks that are completely drained of data are released back to memory area 520. Because the newest-allocated memory chunks are more likely to be drained of transaction data than the older-allocated memory chunks, the memory chunks that are being used to store data for transaction log 500 remains relatively stable despite the large amount of data that is streaming in and being recorded in transaction log 500. As such, this method of garbage collection prevents thrashing of memory resources.

Reducing Redundancy of Invalidation Records

According to an embodiment, standby database system 204 invalidates MF data on a per-data block basis. As such, multiple invalidation records that record changes to rows that are located in the same data block are redundant because application of each one of those invalidation records to the MF data would result in invalidation of the same data block. As such, according to an embodiment, standby database system 204 reduces redundancy in invalidation records by ensuring that only one invalidation record, per transaction, that refers to a particular data block is stored in transaction log 500. This reduction of redundancy reduces the amount of invalidation records that are applied to MF data, and as such, reduces processing required to apply the invalidation records to MF data. Also, when the standby database system is implemented by a cluster, reduction of redundant invalidation records reduces network traffic required to propagate invalidation records to other instances in the cluster.

Specifically, to reduce redundancy of invalidation records, according to an embodiment, each apply slave maintains, for each transaction control structure (i.e., within the slave memory context for the respective apply slave), a buffer structure that implements a circular buffer. A given apply slave stores, in a given buffer structure, a list of unique recently-invalidated RDBAs, i.e., that have been indicated in invalidation records that the apply slave has stored for the associated transaction.

For example, apply slave 210A maintains a circular buffer in slave memory context 506A that stores 100 RDBAs. Apply slave 210A mines, from the stream of change records being received at standby database system 204 from primary database system 200, a change record that changes a data block with a particular RDBA within the range of RDBAs to which apply slave 210A has been assigned. The change record includes the transaction identifier of transaction control structure 504A, meaning that the change record records a change by an operation of the transaction being recorded within transaction control structure 504A.

In response to mining the change record, apply slave 210A checks the circular buffer in slave memory context 506A to determine whether the particular RDBA in the change record is in the circular buffer. If the particular RDBA is included in the circular buffer, then apply slave 210A has already recorded an invalidation record that includes the RDBA and need not include another invalidation record (i.e., with information from the recently-mined change record) that indicates the same RDBA. Thus, responsive to determining that the particular RDBA is included in the circular buffer, apply slave 210A moves on to another change record without generating an invalidation record based on the change record with the particular RDBA. According to an embodiment, the circular buffer is not changed in response to finding that the RDBA of a recently-mined change record is included in the circular buffer.

However, if the particular RDBA is not included in the circular buffer, then apply slave 210A generates an invalidation record for the recently-mined change record as described in detail above. Apply slave 210A also adds the particular RDBA to the circular buffer to prevent creation of future invalidation records with the particular RDBA. When a given circular buffer is full, then to add an additional RDBA to the given circular buffer, an apply slave overwrites the oldest RDBA in the buffer (thus the buffer is known as "circular").

Database System Configuration

Typically, the primary database and the standby database are maintained in separate database systems that are remotely connected. For example, FIG. 1 depicts multiple database systems that are communicatively coupled. Referring to FIG. 1, first database system 100 maintains first database 108, and second database system 114 maintains second database 124. In some example embodiments, first database 108 and second database 124 correspond to the standby database and the primary database, respectively.

First database system 100 and second database system 114 may each correspond to any of a number of different types of database systems, such as a clustered database system and/or a multi-tenant database system. In the example of FIG. 1, first database system 100 includes first persistent storage 112 and first database server computing device 102 running a database server instance 130. Second database system 114 includes second database server computing devices 116A-N and second persistent storage 128. The label "N" in "116N," and in any other reference numeral herein, connotes that any number of elements, items, or sets of items may be present or used in embodiments, as in "1 to n items".

Second database server computing devices 116A-N correspond to clustered nodes that each run one of database server instances 118A-N. Furthermore, first database server computing device 102 runs a database server instance 130. A database server instance (or "instance") is a server that comprises a combination of the software and allocation of resources from a node. Specifically, a server, such as a database server, or any other process is a combination of integrated software components and an allocation of computational resources, such as memory, a node (i.e., a computing device and/or memory accessible to the computing device), and/or sub-processes on the node for executing the integrated software components on a processor, the combination of the software and computational resources being dedicated to performing a particular function on behalf of one or more clients. Whereas first database server computing device 102 runs a single database server instance 130, instances 118A-N collectively implement server-side functions of second database system 114. Second database server computing devices 116A-N may communicate with each other via an interconnect (not shown).

First database 108 and second database 124 may each reside in volatile and/or non-volatile storage, such as first volatile memory 104, second volatile memories 120A-N, first persistent storage 112, and second persistent storage 128. Thus, first database 108 and second database 124 may each include a virtual disk and/or a set of physical disks. Additionally or alternatively, first database 108 and second database 124 may each be stored, at least in part, in main memory of a database server computing device.

One or more of the functions attributed to any process described herein, may be performed any other logical entity that is depicted in FIG. 1, according to one or more embodiments. In an embodiment, each of the techniques and/or functionality described herein is performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
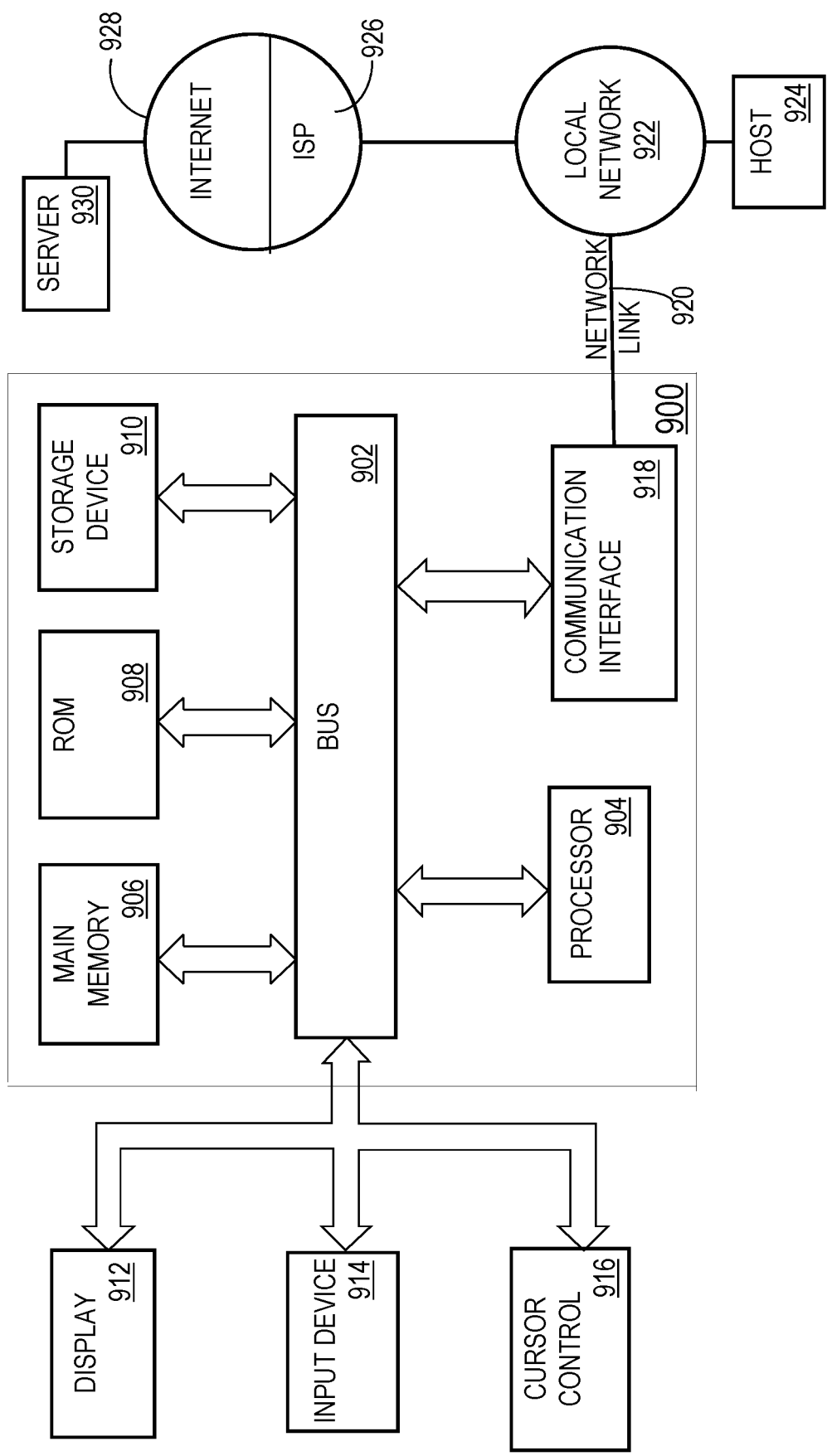
FIG. 9 is a block diagram of a computer system on which embodiments may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
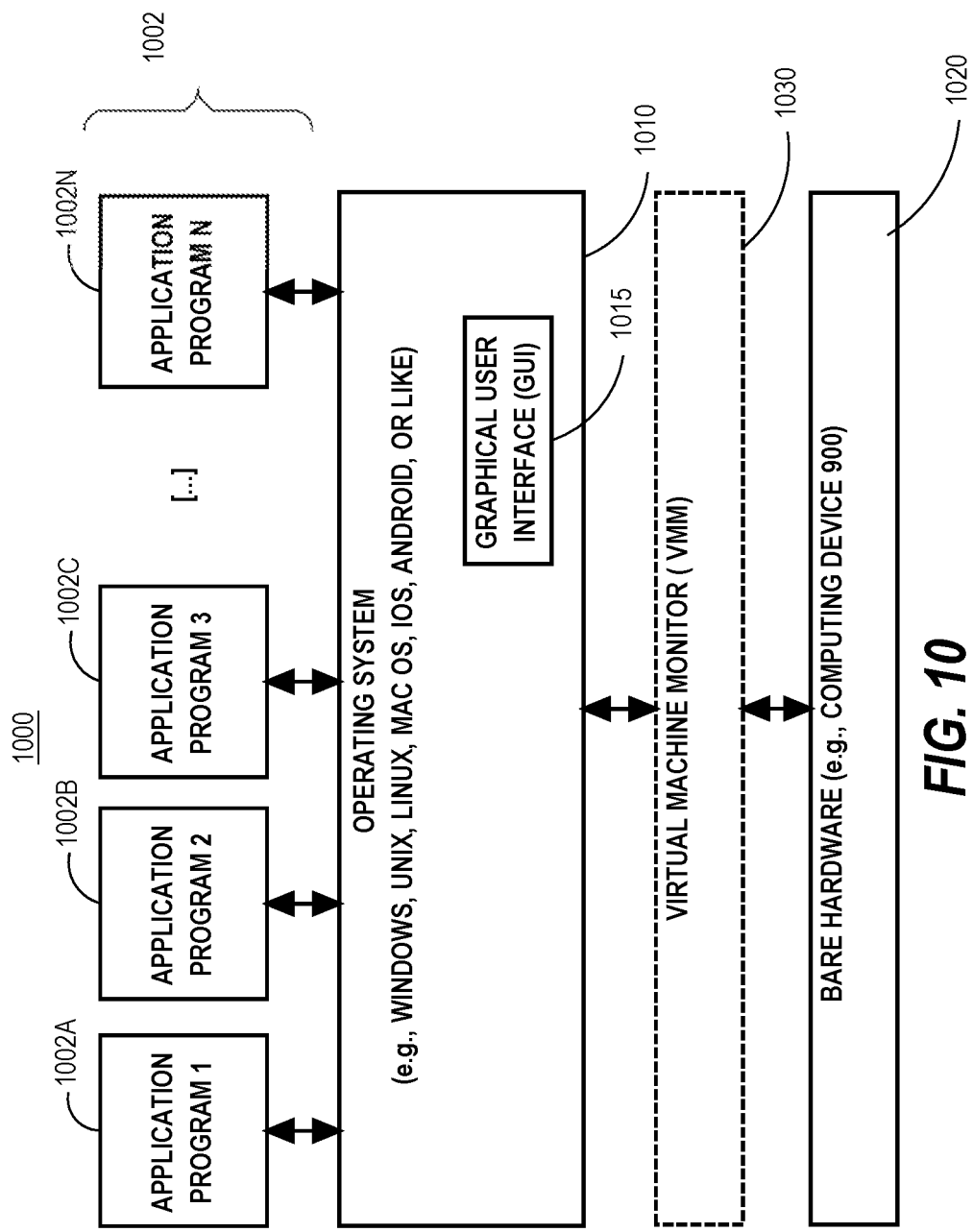
FIG. 10 is a block diagram of a basic software system that may be employed for controlling the operation of a computer system.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DBaaS provider manages or controls the underlying cloud infrastructure, applications, and servers, including one or more database servers.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, on persistent storage, a first database that is accessible to a first database server;
   wherein said first database includes a set of persistent format data (PF data), stored on said persistent storage, in a persistent format;
   converting said set of PF data to a mirror format to produce a set of mirror format data (MF data);
   storing said set of MF data within volatile memory;
   wherein said mirror format is different from and independent of said persistent format;
   maintaining a particular pool of allocated memory chunks comprising a plurality of allocated memory chunks that are allocated from a particular area of memory that is accessible to the first database server;
   wherein the particular area of memory is dedicated to one or more pools of memory chunks including the particular pool of allocated memory chunks;
   wherein a particular memory chunk, of the plurality of allocated memory chunks, comprises a plurality of fixed-length memory slabs;
   wherein the plurality of fixed-length memory slabs comprises one or more vacant memory slabs;
   receiving, by said first database server, one or more change records from a second database server, said one or more change records indicating a particular transaction performed against a second database;
   applying a first change record of the one or more change records to said set of PF data;
   wherein applying the first change record to said set of PF data comprises:
      allocating a particular memory slab, from the one or more vacant memory slabs of the particular memory chunk, to store a transaction control structure for the particular transaction, and
      storing transaction metadata derived from the first change record within the transaction control structure stored in the particular memory slab;
   committing the particular transaction in the set of PF data; and
   after committing the particular transaction in the set of PF data and based, at least in part, on the transaction metadata stored in the transaction control structure, invalidating any of the set of MF data that is changed by the particular transaction;

wherein said method is performed by one or more computing devices.

2. The method of claim 1, further comprising:
hashing a transaction identifier that identifies the particular transaction to produce an index into a transaction log hash table;
wherein the index identifies a particular hash bucket of the transaction log hash table; and
identifying the particular pool of allocated memory chunks based on the particular pool being associated with the particular hash bucket;
wherein allocating the particular memory slab, from the particular memory chunk, is performed in response to identifying the particular pool of allocated memory chunks based on the particular pool being associated with the particular hash bucket.

3. The method of claim 1, wherein allocating the particular memory slab, from the one or more vacant memory slabs of the particular memory chunk, is performed in response to determining that the particular memory chunk is the earliest allocated memory chunk, among the plurality of allocated memory chunks in the particular pool, that has a vacant slab of memory.

4. The method of claim 3, wherein determining that the particular memory chunk is the earliest allocated memory chunk, among the plurality of allocated memory chunks in the particular pool, that has a vacant slab of memory is based on a bit vector, maintained for the particular memory chunk, that records which slabs of memory in the particular memory chunk are vacant.

5. The method of claim 1, wherein applying the first change record to said set of PF data further comprises:
allocating a second memory slab from a second memory chunk of a second pool of allocated memory chunks;
wherein the second memory chunk comprises a second plurality of fixed-length memory slabs that includes the second memory slab;
associating the second memory slab with the transaction control structure as a location of an initial invalidation bundle for the particular transaction;
wherein the second memory slab is configured to store metadata for a fixed plural number of change records; and
storing an invalidation record with data from the first change record in the second memory slab.

6. The method of claim 1, wherein the one or more change records comprise two or more change records, the method further comprising:
a particular apply slave applying a second change record of the two or more change records to said set of PF data;
wherein applying the second change record to said set of PF data comprises:
allocating, to the particular apply slave, a memory granule from a transaction-specific memory chunk that is associated with the transaction control structure for the particular transaction,
recording information identifying the memory granule in a slave memory context within the transaction control structure, and
the particular apply slave storing an invalidation record with data from the second change record in the memory granule.

7. The method of claim 6, further comprising:
the particular apply slave filling the memory granule with a plurality of invalidation records for the particular transaction; and
in response to filling the memory granule with invalidation records for the particular transaction, the particular apply slave sorting, by relative data block address, the plurality of invalidation records within the memory granule.

8. The method of claim 6, further comprising:
the particular apply slave filling the memory granule with a plurality of invalidation records for the particular transaction; and
after filling the memory granule with invalidation records for the particular transaction, and in response to the particular apply slave identifying a change record, for the particular transaction, for which an invalidation record has not yet been recorded, allocating a second memory granule from a transaction-specific memory chunk that is associated with the transaction control structure for the particular transaction.

9. The method of claim 6, wherein the memory granule is dedicated to invalidation records generated by the particular apply slave.

10. The method of claim 1, wherein:
applying the first change record to said set of PF data further comprises:
a particular apply slave determining whether a relative data block address from the first change record is stored in a buffer structure within a slave memory context, for the particular apply slave, within the transaction control structure; and
in response to determining that the relative data block address is not stored in the buffer structure:
storing an invalidation record with information from the first change record in connection with the transaction control structure, and
storing the relative data block address in the buffer structure;
the one or more change records comprise a plurality of change records; and
the method further comprises:
applying a second change record of the plurality of change records to said set of PF data;
wherein the second change record includes the same relative data block address as the first change record; and
wherein applying the second change record to said set of PF data comprises:
the particular apply slave determining whether the relative data block address from the second change record is stored in the buffer structure; and
in response to determining that the relative data block address is stored in the buffer structure, applying a third change record of the plurality of change records without recording an invalidation record for the second change record.

11. The method of claim 1, further comprising:
wherein allocating the particular memory slab to store the transaction control structure for the particular transaction comprises changing a particular bit, which corresponds to the particular memory slab in a bit vector, to indicate that the particular memory slab is occupied; and
after invalidating any of the set of MF data that is changed by the particular transaction, changing the particular bit, in the bit vector, to indicate that the particular memory slab is vacant.

12. One or more non-transitory computer-readable media storing one or more sequences of instructions that, when executed by one or more processors, cause:

maintaining, on persistent storage, a first database that is accessible to a first database server;
wherein said first database includes a set of persistent format data (PF data), stored on said persistent storage, in a persistent format;
converting said set of PF data to a mirror format to produce a set of mirror format data (MF data);
storing said set of MF data within volatile memory;
wherein said mirror format is different from and independent of said persistent format;
maintaining a particular pool of allocated memory chunks comprising a plurality of allocated memory chunks that are allocated from a particular area of memory that is accessible to the first database server;
wherein the particular area of memory is dedicated to one or more pools of memory chunks including the particular pool of allocated memory chunks;
wherein a particular memory chunk, of the plurality of allocated memory chunks, comprises a plurality of fixed-length memory slabs;
wherein the plurality of fixed-length memory slabs comprises one or more vacant memory slabs;
receiving, by said first database server, one or more change records from a second database server, said one or more change records indicating a particular transaction performed against a second database;
applying a first change record of the one or more change records to said set of PF data;
wherein applying the first change record to said set of PF data comprises:
  allocating a particular memory slab, from the one or more vacant memory slabs of the particular memory chunk, to store a transaction control structure for the particular transaction, and
  storing transaction metadata derived from the first change record within the transaction control structure stored in the particular memory slab;
committing the particular transaction in the set of PF data; and
after committing the particular transaction in the set of PF data and based, at least in part, on the transaction metadata stored in the transaction control structure, invalidating any of the set of MF data that is changed by the particular transaction.

13. The one or more non-transitory computer-readable media of claim 12, wherein the one or more sequences of instructions further comprise instructions that, when executed by one or more processors, cause:
  hashing a transaction identifier that identifies the particular transaction to produce an index into a transaction log hash table;
  wherein the index identifies a particular hash bucket of the transaction log hash table; and
  identifying the particular pool of allocated memory chunks based on the particular pool being associated with the particular hash bucket;
  wherein allocating the particular memory slab, from the particular memory chunk, is performed in response to identifying the particular pool of allocated memory chunks based on the particular pool being associated with the particular hash bucket.

14. The one or more non-transitory computer-readable media of claim 12, wherein allocating the particular memory slab, from the one or more vacant memory slabs of the particular memory chunk, is performed in response to determining that the particular memory chunk is the earliest allocated memory chunk, among the plurality of allocated memory chunks in the particular pool, that has a vacant slab of memory.

15. The one or more non-transitory computer-readable media of claim 14, wherein determining that the particular memory chunk is the earliest allocated memory chunk, among the plurality of allocated memory chunks in the particular pool, that has a vacant slab of memory is based on a bit vector, maintained for the particular memory chunk, that records which slabs of memory in the particular memory chunk are vacant.

16. The one or more non-transitory computer-readable media of claim 12, wherein applying the first change record to said set of PF data further comprises:
  allocating a second memory slab from a second memory chunk of a second pool of allocated memory chunks;
  wherein the second memory chunk comprises a second plurality of fixed-length memory slabs that includes the second memory slab;
  associating the second memory slab with the transaction control structure as a location of an initial invalidation bundle for the particular transaction;
  wherein the second memory slab is configured to store metadata for a fixed plural number of change records; and
  storing an invalidation record with data from the first change record in the second memory slab.

17. The one or more non-transitory computer-readable media of claim 12, wherein the one or more change records comprise two or more change records, wherein the one or more sequences of instructions further comprise instructions that, when executed by one or more processors, cause:
  a particular apply slave applying a second change record of the two or more change records to said set of PF data;
  wherein applying the second change record to said set of PF data comprises:
    allocating, to the particular apply slave, a memory granule from a transaction-specific memory chunk that is associated with the transaction control structure for the particular transaction,
    recording information identifying the memory granule in a slave memory context within the transaction control structure, and
    the particular apply slave storing an invalidation record with data from the second change record in the memory granule.

18. The one or more non-transitory computer-readable media of claim 17, wherein the one or more sequences of instructions further comprise instructions that, when executed by one or more processors, cause:
  the particular apply slave filling the memory granule with a plurality of invalidation records for the particular transaction; and
  in response to filling the memory granule with invalidation records for the particular transaction, the particular apply slave sorting, by relative data block address, the plurality of invalidation records within the memory granule.

19. The one or more non-transitory computer-readable media of claim 17, wherein the one or more sequences of instructions further comprise instructions that, when executed by one or more processors, cause:
  the particular apply slave filling the memory granule with a plurality of invalidation records for the particular transaction; and
  after filling the memory granule with invalidation records for the particular transaction, and in response to the particular apply slave identifying a change record, for the particular transaction, for which an invalidation record has not yet been recorded, allocating a second memory granule from a transaction-specific memory chunk that is associated with the transaction control structure for the particular transaction.

20. The one or more non-transitory computer-readable media of claim 17, wherein the memory granule is dedicated to invalidation records generated by the particular apply slave.

21. The one or more non-transitory computer-readable media of claim 12, wherein:
applying the first change record to said set of PF data further comprises:
a particular apply slave determining whether a relative data block address from the first change record is stored in a buffer structure within a slave memory context, for the particular apply slave, within the transaction control structure; and
in response to determining that the relative data block address is not stored in the buffer structure:
storing an invalidation record with information from the first change record in connection with the transaction control structure, and
storing the relative data block address in the buffer structure;
the one or more change records comprise a plurality of change records; and
the one or more sequences of instructions further comprise instructions that, when executed by one or more processors, cause:
applying a second change record of the plurality of change records to said set of PF data;
wherein the second change record includes the same relative data block address as the first change record; and
wherein applying the second change record to said set of PF data comprises:
the particular apply slave determining whether the relative data block address from the second change record is stored in the buffer structure; and
in response to determining that the relative data block address is stored in the buffer structure, applying a third change record of the plurality of change records without recording an invalidation record for the second change record.

22. The one or more non-transitory computer-readable media of claim 12, wherein the one or more sequences of instructions further comprise instructions that, when executed by one or more processors, cause:
wherein allocating the particular memory slab to store the transaction control structure for the particular transaction comprises changing a particular bit, which corresponds to the particular memory slab in a bit vector, to indicate that the particular memory slab is occupied; and
after invalidating any of the set of MF data that is changed by the particular transaction, changing the particular bit, in the bit vector, to indicate that the particular memory slab is vacant.

\* \* \* \* \*